(12) United States Patent
Hamada

(10) Patent No.: US 6,707,597 B2
(45) Date of Patent: Mar. 16, 2004

(54) OPTICAL DEVICE AND METHOD FOR PRODUCING PHOTONIC CRYSTAL

(75) Inventor: Hidenobu Hamada, Amagasaki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/243,266

(22) Filed: Sep. 13, 2002

(65) Prior Publication Data

US 2003/0053352 A1 Mar. 20, 2003

(30) Foreign Application Priority Data

Sep. 17, 2001 (JP) .......................... 2001-281408
Dec. 13, 2001 (JP) .......................... 2001-380011

(51) Int. Cl.$^7$ .............................. G02F 1/00; G02B 6/26
(52) U.S. Cl. ...................... 359/321; 359/322; 385/39; 385/50
(58) Field of Search .................... 359/321, 322; 385/39, 50, 132

(56) References Cited

U.S. PATENT DOCUMENTS 6,188,819 B1  2/2001  Kosaka et al. ............. 385/39
6,317,554 B1  11/2001  Kosaka et al. ............ 385/132
2003/0053352 A1 * 3/2003  Hamada ..................... 365/200

FOREIGN PATENT DOCUMENTS

JP  11-271541   10/1999
JP  2000-56146   2/2000
JP  2000-224109  8/2000
JP  2001-13439   1/2001

OTHER PUBLICATIONS

Hidenobu Hamada "Photonic–Crystal Slabs with a Small Variation in Refractive Index and Application to Optical Functional Devices" Technical Report of IEICE., OPE 2001–107.

* cited by examiner

Primary Examiner—David N. Spector
(74) Attorney, Agent, or Firm—Merchant & Gould P.C.

(57) ABSTRACT

An optical device includes: a complex photonic crystal in which a plurality of materials with different refractive indices are placed periodically, whereby a plurality of photonic crystals with a periodic refractive index distribution are arranged in a column in a direction of a common primitive lattice vector; an ingoing optical waveguide for allowing light to be incident upon the complex photonic crystal; and an outgoing optical waveguide for receiving light output from the complex photonic crystal.

63 Claims, 19 Drawing Sheets

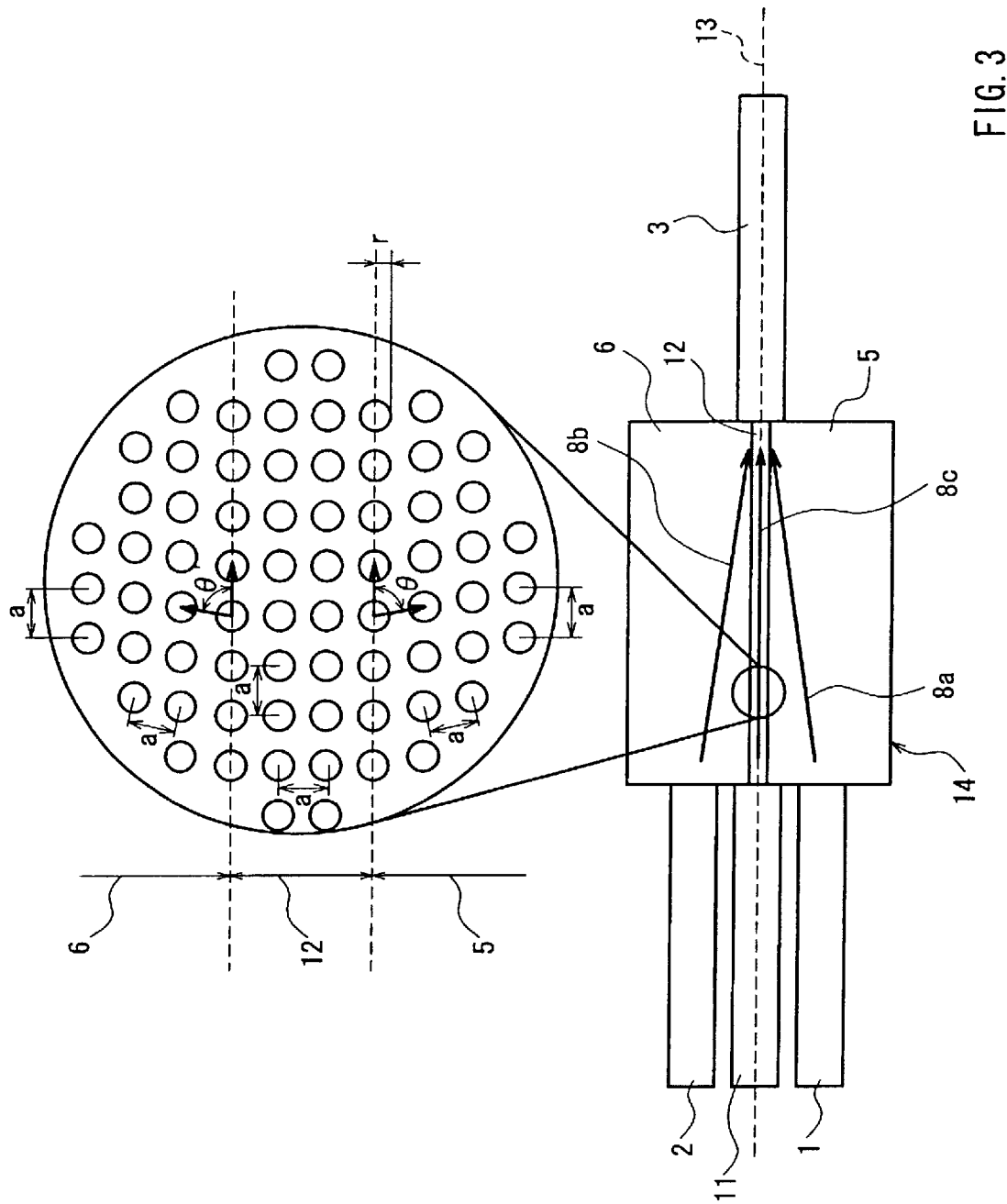

OPTICAL DEVICE AND METHOD FOR PRODUCING PHOTONIC CRYSTAL

BACKGROUND OF THE INVENTION

1. Field of the Invention

The present invention relates to an optical device used for optical communication.

2. Description of the Related Art

FIG. 19 shows an example of an optical coupler using a Y-separation waveguide, which is a conventional optical device. A conventional optical coupler 206 has a configuration in which a Y-shaped core 203 is formed on a substrate 204. A first ingoing optical fiber 201 and a second ingoing optical fiber 202 are placed on one end face of the optical coupler 206, and an outgoing optical fiber 205 is placed on the other end face thereof. The first and second ingoing optical fibers 201 and 202 and the outgoing optical fiber 205 respectively are placed in the vicinity of the end faces of the Y-shaped core 203.

Light is incident upon the optical coupler 206 via the first and second ingoing optical fibers 201 and 202. The respective light beams propagate through the core 203 and are coupled to be output so as to propagate through the outgoing optical fiber 205. The light beams to be coupled need to be in the same phase.

On the other hand, if the ingoing side and the outgoing side of the above-mentioned optical coupler are used in a reverse manner, the optical coupler functions as an optical separator. That is, if incident light is allowed to propagate through the outgoing optical fiber 205, the light is separated to be incident upon the first and second ingoing optical fibers 201 and 202, respectively.

In an optical device such as the above-mentioned optical coupler 206, in order to couple light among the core 203, the first and second ingoing optical fibers 201 and 202, and the outgoing optical fiber 205, it is required to conduct the alignment of optical axes and matching in a mode shape with high precision. Therefore, skilled labor is required for assembling the device. In addition, a coupling angle of the optical coupler 206 is small, so that the device cannot be miniaturized.

Furthermore, in a conventional optical device, a light transmitting/receiving module for WDM (wavelength division multiplexing) that couples a plurality of light beams or separates light is constituted by using an optical waveguide, a multi-layer filter, and the like. This increases the number of components, making it difficult to achieve a low cost.

In order to solve the above-mentioned problems, recently, producing an optical fiber by using a photonic crystal has drawn attention. For example, JP 11(1999)-271541 A discloses a wavelength separating circuit using a photonic crystal of a two-dimensional triangular lattice.

In the present specification, the term "photonic crystal" refers to an artificial multi-dimensional periodic structure substantially having a period of a light wavelength. It is known that light with a predetermined frequency, which propagates through a photonic crystal, is deflected. More specifically, a photonic crystal has wavelength dispersion characteristics with a strong deflection that is not found in general optical crystal. Due to the characteristics, a photonic crystal is used for an optical device such as a device for WDM.

The wavelength separating circuit using a photonic crystal disclosed in JP 11(1999)-271541 A allows light to be incident thereupon by placing a light incident surface to a photonic crystal in a non-vertical direction to a lattice vector or by tilting the light incident surface with respect to an incident surface perpendicular to the lattice vector direction. This is because the above-mentioned wavelength separating circuit uses a photonic crystal with a high symmetry such as a tetragonal lattice and a triangular lattice. This configuration requires a higher processing precision of an incident angle of an optical system in the course of production of a photonic crystal, making modularization difficult.

Furthermore, in a conventional optical device using a photonic crystal, such as an optical fiber, only two kinds of wavelengths are used, and in an optical device for power separation, only one kind of wavelength is used.

SUMMARY OF THE INVENTION

Therefore, with the foregoing in mind, it is an object of the present invention to provide an optical device, such as an optical filter for WDM and an ADD-DROP apparatus for separating at least three kinds of wavelengths, a separator for WDM for power-separating at least two wavelengths, and an optical coupler, which can be produced easily and miniaturized, and a method for producing a photonic crystal.

An optical device of the present invention includes: a complex photonic crystal in which a plurality of materials with different refractive indices are placed periodically, whereby a plurality of photonic crystals with a periodic refractive index distribution are arranged in a column in a direction of a common primitive lattice vector; an ingoing optical waveguide for allowing light to be incident upon the complex photonic crystal; and an outgoing optical waveguide for receiving light output from the complex photonic crystal. Because of this, an optical device used for optical communication can be produced easily.

Furthermore, in each of the photonic crystals, at least one of a refractive index of the plurality of materials and a periodic structure of a refractive index thereof may be varied on the photonic crystal basis.

Furthermore, each of the photonic crystals may be a two-dimensional photonic crystal.

Furthermore, preferably, two primitive lattice vectors of each of the photonic crystals are parallel to each other, and either one of the two primitive lattice vectors is matched with an optical axis. Because of this, light (selection light) is deflected in a photonic crystal and can be controlled.

Furthermore, the photonic crystal may be interposed between a first cladding and a second cladding.

Furthermore, preferably, a refractive index of at least one of the first cladding and the second cladding is 1. Because of this, the cladding can be made of air, which reduces the number of components.

Furthermore, preferably, the above-mentioned optical device includes a groove for positioning the ingoing optical waveguide and the outgoing optical waveguide that are optical fibers. Because of this, it is possible to position an optical fiber easily without alignment of optical axes and matching in a mode shape with high precision.

Furthermore, the groove may be integrated with each of the photonic crystals directly or indirectly.

Furthermore, preferably, the complex photonic crystal is covered with an air-tight case completely, and an inside of the air-tight case is filled with a gas or evacuated. Because of this, the refractive index of the columnar materials that are made of a gas is not varied by a change in an external environment. This allows an optical device with good stability to realized.

Furthermore, preferably, each of the photonic crystals has a refractive index period determined by a specific wavelength of light that is deflected in each of the photonic crystals, and the specific wavelength is varied depending upon each of the photonic crystals. Because of this, light with a plurality of wavelengths can be dealt with.

Furthermore, an order in a column of each of the photonic crystals may be determined based on the specific wavelength of each of the photonic crystals.

Furthermore, preferably, each of the photonic crystals has a two-dimensional lattice structure in which a first material and columnar materials having different refractive indices are provided, and the columnar materials are arranged periodically in the first material so that axes of the columnar materials are parallel to each other, an acute angle between two primitive lattice vectors of the photonic crystal is larger than 60° and smaller than 90°, the photonic crystals are arranged in a column in a direction of a first primitive lattice vector that is one of the two primitive lattice vectors to form the complex photonic crystal. The ingoing optical waveguide includes a first ingoing optical waveguide that is placed on a photonic crystal in a first stage of the complex photonic crystal, for allowing light other than light having a specific wavelength of each of the photonic crystals to be incident upon the complex photonic crystal in the direction of the first primitive lattice vector, and a second ingoing optical waveguide that is placed on each of the photonic crystals, for allowing light having a specific wavelength to be incident upon each of the photonic crystals, and the outgoing optical waveguide is placed so as to have the same optical axis as that of the first ingoing optical wave guide. Because of this, an optical device can be realized that is produced easily and enables light having a plurality of wavelengths to be coupled in an arbitrary order.

Furthermore, the second ingoing optical waveguide may be placed on a side of each of the photonic crystals.

Furthermore, preferably, end faces of the photonic crystals increase in size successively, and the second ingoing optical waveguide is placed on the end face of each of the photonic crystals. Because of this, the second ingoing optical waveguide is not placed on the photonic crystal in a lateral direction, so that an optical device with a small width can be realized.

Furthermore, each of the photonic crystals at least other than the photonic crystal in a final stage has a mirror having a predetermined angle with respect to an outgoing end face connected in a column on a part of the end face, and light from the second ingoing optical waveguide is reflected from the mirror and is incident upon the photonic crystal in a subsequent stage.

Furthermore, preferably, each of the photonic crystals has a two-dimensional lattice structure in which a first material and columnar materials having different refractive indices are provided, and the columnar materials are arranged periodically in the first material so that axes of the columnar materials are parallel to each other, an acute angle between two primitive lattice vectors of the photonic crystal is larger than 60° and smaller than 90°, the photonic crystals are arranged in a column in a direction of a first primitive lattice vector that is one of the two primitive lattice vectors to form the complex photonic crystal. The ingoing optical waveguide allows light to be incident upon the complex photonic crystal in the direction of the first primitive lattice vector, and the outgoing optical waveguide includes a first outgoing optical waveguide that is placed on a photonic crystal in a final stage of the complex photonic crystal, for receiving light output in the direction of the first primitive lattice direction, and a second outgoing optical waveguide placed on each of the photonic crystals. Because of this, an optical device can be realized, which is produced easily and allows light with a plurality of wavelengths to be separated in an arbitrary order.

Furthermore, the second outgoing optical waveguide placed on each of the photonic crystals receives light with the specific wavelength, which is deflected in the photonic crystal and output therefrom.

Furthermore, a lattice constant of each of the photonic crystals may be 0.4 to 0.6 times the specific wavelength of each of the photonic crystals.

Furthermore, the second outgoing optical waveguide may be placed on a side of each of the photonic crystals.

Furthermore, preferably, only the second outgoing optical waveguide connected to the photonic crystal in the final stage of the complex photonic crystal is placed on an end face of the photonic crystal. Because of this, the length of the photonic crystal in the final stage can be made small, so that the entire optical device can be miniaturized.

Furthermore, preferably, end faces of the photonic crystals decrease in size successively, and the second outgoing optical waveguide is placed on the end face of each of the photonic crystals. Because of this, an optical device with a small width can be realized.

Furthermore, each of the photonic crystals at least other than the photonic crystal in a first stage has a mirror, which has a predetermined angle with respect to an ingoing end face connected in a column, on a part of the end face, and the second outgoing optical waveguide is provided at a position so as to receive light reflected from the mirror, which has the specific wavelength and is output from the photonic crystal in a previous stage.

Furthermore, another optical device of the present invention includes: a second complex photonic crystal in which a plurality of first complex photonic crystals, each including a first photonic crystal and a second photonic crystal connected to each other, are connected in a column so that each boundary face is placed on the same face; an ingoing optical waveguide for allowing light to be incident upon the second complex photonic crystal; and an outgoing optical waveguide for receiving light output from the second complex photonic crystal. Because of this, an optical device can be produced easily, and the cost thereof can be reduced.

Furthermore, the second complex photonic crystal may be interposed between a first cladding and a second cladding.

Furthermore, a refractive index of at least one of the first cladding and the second cladding may be 1.

Furthermore, the above-mentioned optical device may include a groove for positioning the ingoing optical waveguide and the outgoing optical waveguide that are optical fibers.

Furthermore, the groove may be integrated with the second complex photonic crystal directly or indirectly.

Furthermore, the second complex photonic crystal may be covered with an air-tight case completely, and an inside of the air-tight case may be filled with a gas or evacuated.

Furthermore, preferably, the first photonic crystal and the second photonic crystal have a two-dimensional lattice structure in which a first material and columnar materials having different refractive indices are provided, and the columnar materials are arranged periodically in the first material so that axes of the columnar materials are parallel to each other, an acute angle between respective primitive lattice vectors of the first photonic crystal and the second photonic crystal is larger than 60° and smaller than 90°, a first primitive lattice vector of the first photonic crystal and a first primitive lattice vector of the second photonic crystal are parallel to each other, and are parallel to a boundary face where the first photonic crystal and the second photonic crystal are bonded to each other, a lattice structure of the first photonic crystal is symmetrical to a lattice structure of the second photonic crystal with respect to the boundary face, and the outgoing optical waveguide is placed on an end face of the first complex photonic crystal in a final stage of the second complex photonic crystal. Because of this, an optical device can be realized, which is produced easily and allows light with a plurality of wavelengths to be coupled in an arbitrary order.

Furthermore, a length of each of the first complex photonic crystals may be set so that light beams with wavelengths specific to each of the first photonic crystals and each of the second photonic crystals, which are deflected therein and output therefrom, are output from end faces of each of the first photonic crystals and each of the second photonic crystals.

Furthermore, a length of each of the first complex photonic crystal is set so that light beams with wavelengths specific to each of the first photonic crystal and each of the second photonic crystal, which are deflected therein, cross each other at an end of each of the photonic crystals.

Furthermore, preferably, each of the first photonic crystal and the second photonic crystal has a two-dimensional lattice structure in which a first material and columnar materials having different refractive indices are provided, and the columnar materials are arranged periodically in the first material so that axes of the columnar materials are parallel to each other, an acute angle between respective primitive lattice vectors of the first photonic crystal and the second photonic crystal is larger than 60° and smaller than 90°, a first primitive lattice vector of the first photonic crystal and a first primitive lattice vector of the second photonic crystal are parallel to each other, and are parallel to a boundary face where the first photonic crystal and the second photonic crystal are bonded to each other, a lattice structure of the first photonic crystal is symmetrical to a lattice structure of the second photonic crystal with respect to the boundary face, and the outgoing optical waveguide includes a first outgoing optical waveguide placed on the first photonic crystal in a final stage of the second complex photonic crystal, for receiving light output in a direction of the first primitive lattice vector, and a second outgoing optical waveguide placed on each of the first complex photonic crystals, for receiving light beams with wavelengths specific to each of the first photonic crystals and each of the second photonic crystals, which are deflected therein and output therefrom. Because of this, an optical device can be realized, which is produced easily and allows light with a plurality of wavelengths to be separated in an arbitrary order.

Furthermore, a difference between a refractive index of the first material and a refractive index of the columnar materials may be at least 1.0.

Furthermore, the first material may be made of a polymer, and the columnar materials may be made of a gas.

Furthermore, a lattice constant of each of the first photonic crystal and the second photonic crystal may be 0.4 to 0.6 times the specific wavelength.

Furthermore, a cross-sectional shape of the columnar materials may be a circle with a radius of 0.08 to 0.3 times the specific wavelength.

Still another optical device of the present invention includes: a first photonic crystal having a first ingoing optical waveguide placed on an ingoing end face and a first outgoing optical waveguide and an optical waveguide for DROP placed on an outgoing end face; and a second photonic crystal having a second ingoing optical waveguide and an optical waveguide for ADD placed on an ingoing end face and a second outgoing optical waveguide placed on an outgoing end face. Furthermore, the first outgoing optical waveguide and the second ingoing optical waveguide, or the first ingoing optical waveguide and the first outgoing optical waveguide are connected to each other, the first photonic crystal and the second photonic crystal have a two-dimensional lattice structure in which a first material and columnar materials having different refractive indices are provided, and the columnar materials are arranged periodically in the first material so that axes of the columnar materials are parallel to each other, an acute angle between respective primitive lattice vectors of the first photonic crystal and the second photonic crystal is larger than 60° and smaller than 90°, light incident upon the optical waveguide for DROP has a specific wavelength so as to be deflected in the first photonic crystal, and light incident upon the second photonic crystal from the optical waveguide for ADD has a specific wavelength so as to be deflected in the second photonic crystal. Because of this, an optical device can be realized that is capable of taking only a particular wavelength and adding the wavelength again in the course of multiplex transmission of wavelengths.

Furthermore, preferably, light that is deflected in the first photonic crystal and is incident upon the optical waveguide for DROP is processed to be incident upon the optical waveguide for ADD. Because of this, an optical device can be realized that is capable of taking only a particular wavelength and adding it again after modifying it in the course of multiplex transmission of wavelengths.

Furthermore, the first ingoing optical waveguide, the second ingoing optical waveguide, the first outgoing optical waveguide, the second outgoing optical waveguide, the optical waveguide for ADD, and the optical waveguide for DROP may be optical fibers.

Furthermore, still another optical device of the present invention includes: a complex photonic crystal having a configuration in which a waveguide portion is interposed between a first photonic crystal and a second photonic crystal; an ingoing optical waveguide placed on one end face of the complex photonic crystal; and three outgoing optical waveguides placed on the other end face of the complex photonic crystal. The first photonic crystal and the second photonic crystal have a two-dimensional lattice structure in which a first material and columnar materials having different refractive indices are provided, and the columnar materials are arranged periodically in the first material so that axes of the columnar materials are parallel to each other, an acute angle between respective primitive lattice vectors of the first photonic crystal and the second photonic crystal is larger than 60° and smaller than 90°, a direction of a first primitive lattice vector of the first photonic crystal, a direction of a first primitive lattice vector of the second photonic crystal, a direction of an optical axis of the ingoing optical waveguide, a boundary face between the first photonic crystal and the waveguide portion, and a boundary face between the second photonic crystal and the waveguide portion are parallel to each other, a lattice structure of the first photonic crystal is symmetrical to a lattice structure of the second photonic crystal with respect to the waveguide portion, and an optical axis of the ingoing optical waveguide is in the waveguide portion and is identical with an optical axis of one of the outgoing optical waveguides, and optical axes of the other two outgoing optical waveguides are placed so as to be symmetrical to the optical axis of the ingoing optical waveguide. Because of this, an optical separator can be realized that is produced easily and is capable of separating light into three light beams.

Furthermore, preferably, a width of the waveguide portion is smaller than a core diameter of the ingoing optical waveguide. Because of this, an optical separator capable of separating light into three light beams can be realized.

Furthermore, still another optical device of the present invention includes: a complex photonic crystal having a configuration in which a waveguide portion is interposed between a first photonic crystal and a second photonic crystal; three ingoing optical waveguides placed on one end face of the complex photonic crystal; and an outgoing optical waveguide placed on the other end face of the complex photonic crystal. The first photonic crystal and the second photonic crystal have a two-dimensional lattice structure in which a first material and columnar materials having different refractive indices are provided, and the columnar materials are arranged periodically in the first material so that axes of the columnar materials are parallel to each other, an acute angle between respective primitive lattice vectors of the first photonic crystal and the second photonic crystal is larger than 60° and smaller than 90°, a direction of a first primitive lattice vector of the first photonic crystal, a direction of a first primitive lattice vector of the second photonic crystal, a direction of an optical axis of the ingoing optical waveguide, a boundary face between the first photonic crystal and the waveguide portion, and a boundary face between the second photonic crystal and the waveguide portion are parallel to each other, a lattice structure of the first photonic crystal is symmetrical to a lattice structure of the second photonic crystal with respect to the waveguide portion, and an optical axis of one of the ingoing optical waveguides is in the waveguide portion and is identical with an optical axis of the outgoing optical waveguide, and optical axes of the other two ingoing optical waveguides are placed so as to be symmetrical to the optical axis of one of the ingoing optical waveguides. Because of this, a 3-coupler that is produced easily can be realized.

Furthermore, preferably, the ingoing optical waveguide and the outgoing optical waveguide are optical fibers. Because of this, the ingoing optical waveguide and the outgoing optical waveguide can be bent, easily dealt with, and set.

Furthermore, preferably, a width of the waveguide portion is smaller than a core diameter of the ingoing optical waveguide. Because of this, a 3-coupler can be realized.

Furthermore, still another optical device of the present invention includes: a complex photonic crystal in which a first photonic crystal is bonded to a second photonic crystal; a first ingoing optical waveguide for allowing light to be incident upon the first photonic crystal of the complex photonic crystal; a second ingoing optical waveguide for allowing light to be incident upon the second photonic crystal of the complex photonic crystal; and an outgoing optical waveguide for receiving light output from the complex photonic crystal. The first photonic crystal and the second photonic crystal have a two-dimensional lattice structure in which a first material and columnar materials having different refractive indices are provided, and the columnar materials are arranged periodically in the first material so that axes of the columnar materials are parallel to each other, an acute angle between respective primitive lattice vectors of the first photonic crystal and the second photonic crystal is larger than 60° and smaller than 90°, a first primitive lattice vector of the first photonic crystal and a first primitive lattice vector of the second photonic crystal are parallel to each other, and are parallel to a boundary face where the first photonic crystal and the second photonic crystal are bonded to each other, a lattice structure of the first photonic crystal is symmetrical to a lattice structure of the second photonic crystal with respect to the boundary face, and light beams specific to each of the first photonic crystals and each of the second photonic crystals, which are deflected therein and output therefrom, cross each other on an end face of the complex photonic crystal. Because of this, an optical coupler that is produced easily can be realized.

Furthermore, still another optical device of the present invention includes: a photonic crystal; a first ingoing optical waveguide and a second ingoing optical waveguide for allowing light to be incident upon the photonic crystal; and an outgoing optical waveguide for receiving light output from the photonic crystal. The photonic crystal has a two-dimensional lattice structure in which a first material and columnar materials having different refractive indices are provided, and the columnar materials are arranged periodically in the first material so that axes of the columnar materials are parallel to each other, an acute angle between primitive lattice vectors of the photonic crystal is larger than 60° and smaller than 90°, the first ingoing optical waveguide and the second ingoing optical waveguide allow light to be incident in a direction of a first primitive lattice vector of the photonic crystal, and an optical axis of the first ingoing optical waveguide is identical with an optical axis of the outgoing optical waveguide. Because of this, an optical separator that is produced easily can be realized.

Furthermore, the first ingoing optical waveguide, the second ingoing optical waveguide, and the outgoing optical waveguide may be optical fibers.

Furthermore, a distance between the first ingoing optical waveguide and the second ingoing optical waveguide may be proportional to a length of the photonic crystal.

Furthermore, a method for producing a photonic crystal of the present invention includes: irradiating a single ion at desired positions for placing columnar materials of a first material formed on a substrate, thereby forming a track in the first material; and soaking the substrate and the first material in an alkaline solution to erode the track, thereby forming columnar holes. Because of this, a photonic crystal can be configured easily.

Furthermore, at least one single ion may be irradiated.

Furthermore, preferably, the energy of the single ion is 1 MeV or more. Because of this, an ion penetrates the first material deeply.

Furthermore, the columnar holes may be filled with a material having a refractive index different from that of the first material.

Furthermore, the first material may be made of a polymer material, and the columnar holes may be filled with a gas.

These and other advantages of the present invention will become apparent to those skilled in the art upon reading and understanding the following detailed description with reference to the accompanying figures.

BRIEF DESCRIPTION OF THE DRAWINGS

FIG. 3 is a plan view showing a configuration of an optical device of Embodiment 2 according to the present invention.

DESCRIPTION OF THE PREFERRED EMBODIMENTS

Embodiment 1

Figure 1:
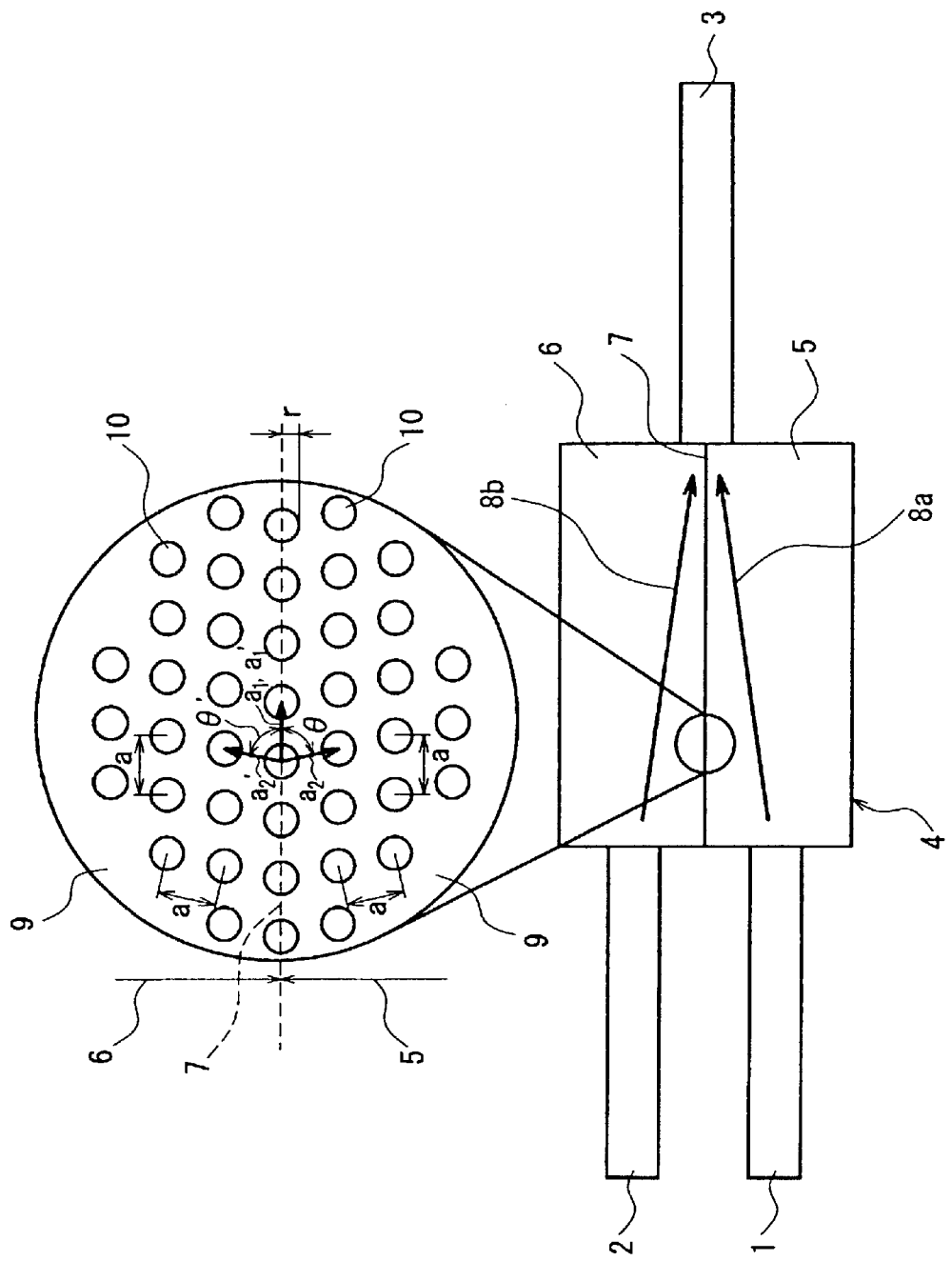
FIG. 1 is a plan view showing a configuration of an optical device of Embodiment 1 according to the present invention.

An optical device of Embodiment 1 according to the present invention will be described with reference to FIG. 1. The optical device of Embodiment 1 is an optical coupler for coupling two light beams with the same wavelength into one light beam. Ingoing optical fibers 1 and 2 are placed on one end face of a complex photonic crystal 4, and an outgoing optical fiber 3 is placed on the other end face thereof. The complex photonic crystal 4 is configured in such a manner that two kinds of photonic crystals 5 and 6 are bonded to each other at a boundary face 7.

The photonic crystals 5 and 6 have a two-dimensional lattice structure, in which cylindrical columnar materials 10 are placed periodically in a first material 9. The central axes of the respective columnar materials 10 are disposed in parallel with each other. For example, the refractive index of the first material 9 may be about 1.5 to 1.7, and made of an acrylic resin (PMMA, UV acrylate resin, etc.), epoxy resin, polyimide, silicone resin, carbonate resin such as polycarbonate, or the like. The columnar materials 10 may be made of air. Such a configuration can be obtained only by forming holes in a $SiO_2$ substrate; therefore, a photonic crystal can be produced easily.

In order to allow the photonic crystals 5 and 6 to exhibit remarkable deflection dispersion characteristics, a lattice constant "a" (distance between columnar materials) of the columnar materials 10 preferably is 0.4 to 0.6 times the wavelength of light to be propagated, and a radius "r" of the columnar materials 10 preferably is 0.08 to 0.3 (0.2 to 0.5 of the lattice constant "a") times the wavelength of light to be propagated.

Figure 2A:
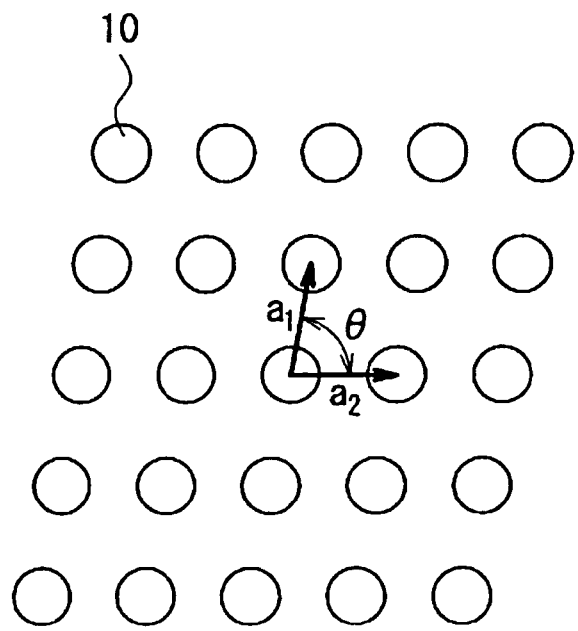
FIG. 2A is a plan view of a lattice structure of an oblique lattice with a low symmetry.
Figure 2B:
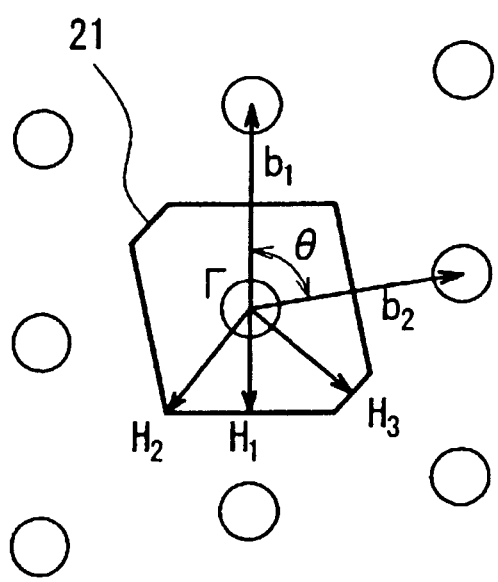
FIG. 2B is a plan view of a Brillouin zone.

The photonic crystal 5 in Embodiment 1 is an oblique lattice with a low symmetry. FIGS. 2A and 2B are plan views showing a lattice structure of an oblique lattice with a low symmetry and a Brillouin zone. The columnar materials 10 form a lattice. As shown in FIG. 2A, an inner acute angle θ of lattice vectors ($a_1$, $a_2$) of the oblique lattice with a low symmetry is larger than 60° and smaller than 90°.

FIG. 2B shows a Brillouin zone in the above-mentioned lattice structure. Main symmetry points of the Brillouin zone 21 are three points (H1, H2, H3). In this case, incident light in the direction of primitive lattice vectors ($a_1$, $a_2$) is not matched with the direction of main symmetry points of the Brillouin zone 21, whereby a deflection dispersion is exhibited. Therefore, when light is allowed to be vertically incident upon an incident surface vertical to the primitive lattice vectors ($a_1$, $a_2$), a photonic crystal with an oblique lattice structure with a low symmetry exhibits strong deflection dispersion characteristics. That is, the photonic crystal having an oblique lattice structure with a low symmetry tends to deflect light incident in the direction of the primitive lattice vector $a_1$ of the photonic crystal. All the light beams are not deflected, but only a light beam with an arbitrary wavelength is deflected (hereinafter, light that is deflected will be referred to as selection light). It is determined by the lattice structure in which direction light with which wavelength is deflected.

As described above, selection light is deflected, when it is incident upon the photonic crystal having an oblique lattice structure with a low symmetry in the direction of the primitive lattice vector $a_1$, or $a_2$.

Herein, the photonic crystal with a two-dimensional lattice structure has been described. However, even a photonic crystal with a three-dimensional lattice structure exhibits deflection dispersion characteristics, as long as it has an oblique lattice structure with a low symmetry. If light is allowed to be incident upon such a photonic crystal in the direction of a primitive lattice vector, the light is deflected.

The photonic crystals 5 and 6 have the above-mentioned oblique lattice structure with a low symmetry and deflection dispersion characteristics. The lattice structure of the photonic crystal 5 is symmetrical to that of the photonic crystal 6 with respect to the boundary face 7. More specifically, in each of the photonic crystals 5 and 6, the cylindrical columnar materials 10 with a radius "r" are arranged in the first material 9 so as to have a lattice constant "a" in such a manner that the central axes thereof are in parallel with each other. The lattice constant "a" refers to the distance between the respective adjacent columnar materials. 10. Furthermore, the columnar materials 10 of the photonic crystals 5 and 6 are arranged symmetrically with respect to the boundary face 7. The inner angle θ between the primitive lattice vectors ($a_1$, $a_2$) of the photonic crystal 5 is equal to an inner angle "θ'" between primitive lattice vectors ($a_1'$, $a_2'$) of the photonic crystal 6.

For example, the photonic crystals 5 and 6 have a two-dimensional crystal lattice in which air holes are arranged periodically with a lattice constant "a", where the air holes are the columnar materials 10 with a radius "r" that is 0.14 times the wavelength of light to be propagated through a thin film core (first material 9) made of glass or a polymer, and the lattice constant "a" is 0.54 times the light wavelength. The inner angle θ between the primitive lattice vectors ($a_1$, $a_2$) of the photonic crystal 5 and the inner angle θ' between the primitive lattice vectors ($a_1'$, $a_2'$) of the photonic crystal 6 are both 80°.

Furthermore, the optical axes of the ingoing optical fibers 1 and 2, that of the outgoing optical fiber 3, the primitive lattice vectors ($a_1$, $a_2$) of the photonic crystal 5, and the primitive lattice vectors ($a_1'$, $a_2'$) of the photonic crystal 6 are on the same plane, and the first primitive lattice vector $a_1'$ of the photonic crystal 5 and the first primitive lattice vector $a_1'$ of the photonic crystal 6 are the same.

The photonic crystals 5 and 6 are bonded to form the complex photonic crystal 4. The respective ingoing optical fibers 1 and 2 are placed symmetrically with respect to the boundary face 7 at predetermined positions of the photonic crystals 5 and 6. The outgoing optical fiber 3 is placed at a position where its optical axis is included in the boundary face 7.

The portions where the complex photonic crystal 4 is in contact with the ingoing optical fibers 1 and 2 are perpendicular to the primitive lattice vector $a_1$ of the photonic crystals 5 and 6.

When light (i.e., selection light) with a wavelength that does not allow the light be deflected is allowed to be incident upon the photonic crystal 5 in the direction of the primitive lattice vector $a_1$, the light is deflected in a traveling direction 8a. Furthermore, the photonic crystal 6 is symmetrical to the photonic crystal 5 with respect to the boundary face 7. Therefore, similarly, when selection light with the same wavelength is allowed to be incident in the direction of the primitive lattice vector $a_1'$, the light is deflected in a traveling direction 8b that is symmetrical to the traveling direction 8a with respect to the boundary face 7. For example, the angle (deflection angle) formed by the incident direction and the deflection direction of the selection light is 10°. At this time, a coupling angle becomes 20°, which is larger than the coupling angle of a conventional coupler using a Y-separation waveguide.

The traveling directions 8a and 8b both are directed to the boundary face 7. Therefore, the size of the complex photonic crystal 4 is determined in such a manner that the position where light propagating through the ingoing optical fiber 1 and light propagating through the ingoing optical fiber 2 is matched with an end face of the complex photonic crystal 4. The crossing light beams are coupled to each other so as to be output from the end face of the complex photonic crystal 4. The output light is incident upon the outgoing optical fiber 3 and propagates therethrough. The light beams to be coupled are in the same phase.

As described above, the deflection angle or wavelength of selection light can be controlled by changing the structure of the photonic crystals 5 and 6. For example, by changing the distance "a" between the columnar materials 10 or by altering the columnar materials 10 and the first material 9, the wavelength, deflection angle, and the like of selection light can be controlled.

As described above, when an optical device is constituted by using a photonic crystal, a Y-separation waveguide is not used; therefore, the alignment of optical axes and matching in a mode shape with high precision are not required. As a result, an optical coupler can be produced easily. Furthermore, an optical coupler having a coupling angle larger than that of a conventional optical coupler using a Y-separation waveguide can be realized. This enables light to be coupled sufficiently with a short distance, resulting in miniaturization of an optical device.

Examples of the polymer material for the first material 9 include an acrylic polyer (PMMA, UV acrylate polymer, etc.), an epoxy polymer, a polyimide polymer, a silicone polymer, polycarbonate, and the like.

Furthermore, the difference in a relative refractive index between the first material 9 and the columnar materials 10 constituting a photonic crystal may be 1.0 or more. A high refractive material such as Si, GaAs, and $Ti_2O_5$ may be used as the first material 9, and a low refractive material such as $SiO_2$ may be used for the column materials 10. Furthermore, the photonic crystal has its characteristics changed due to the refractive index of constituent materials. Therefore, the selection of the constituent materials is important. Other materials satisfying the condition of the refractive index may be used irrespective of whether they are in a solid state (general dielectrics such as an oxide), a liquid state (water, ethylene glycol, etc.), or a gaseous state (air, gas, etc.).

Embodiment 2

An optical device of Embodiment 2 according to the present invention will be described with reference to FIG. 3. The optical device of Embodiment 2 is a 3-coupler for coupling three light beams with the same wavelength to obtain one light beam.

The optical device of Embodiment 2 is composed of ingoing optical fibers 1 and 2, an outgoing optical fiber 3, and a complex photonic crystal 14. In the complex photonic crystal 14, photonic crystals 5 and 6 are not bonded to each other directly but via a photonic crystal 12. That is, the photonic crystals 5 and 6 are bonded to the photonic crystal 12, respectively.

In the photonic crystal 12, cylindrical columnar materials 10 are arranged in a first material 9 in such a manner that the central axes thereof are in parallel with each other in the same way as in the photonic crystals 5 and 6. The lattice constant "a" of the photonic crystal 12 also is the same as that of the photonic crystals 5 and 6. However, the photonic crystal 12 has a high symmetry, and the inner angle between primitive lattice vectors is 90°. Even if predetermined light is allowed to be incident upon the photonic crystal 12 with such a structure in the direction of the primitive lattice vector, the light travels straight through the photonic crystal 12 without being deflected.

The ingoing optical fiber 1 is placed on an end face of the photonic crystal 5 so that light propagating through the ingoing optical fiber 1 is incident upon the photonic crystal 5. The ingoing optical fiber 2 is placed on an end face of the photonic crystal 6 so that light propagating through the ingoing optical fiber 2 is incident upon the photonic crystal 6. Furthermore, the ingoing optical fiber 11 is placed on an end face of the photonic crystal 12 so that light propagating through the ingoing optical fiber 11 is incident upon the photonic crystal 12.

The outgoing optical fiber 3 is placed on an end face of the complex photonic crystal 14 opposite to the end face where the ingoing optical fibers 1, 2, and 11 are placed. The outgoing optical fiber 3 is placed so that its optical axis is included in the photonic crystal 12 so as to be coupled to light output from the complex photonic crystal 14, and its axis is the same as an optical axis 13 of the ingoing optical fiber 11.

The ingoing optical fibers 1 and 2 are placed symmetrically with respect to the optical axis 13 of the ingoing optical fiber 11. The optical axis 13 preferably is at a central position of the photonic crystal 12.

Selection light incident upon the complex photonic crystal 14 (photonic crystal 5) via the ingoing optical fiber 1 is deflected to a traveling direction 8a. Selection light incident upon the complex photonic crystal 14 (photonic crystal 6) via the ingoing optical fiber 2 is deflected to a traveling direction 8b. Furthermore, selection light incident upon the complex photonic crystal 14 (photonic crystal 12) via the ingoing optical fiber 11 travels straight along the optical axis 13 in a traveling direction 8c. The size of the complex photonic crystal 14 is determined so that the position where three kinds of these light beams cross each other is matched with the end face of the complex photonic crystal 14. Because of this, three kinds of light beams cross each other on the end face of the complex photonic crystal 14 and are coupled to be output. The coupled light output from the complex photonic crystal 14 is incident upon and propagates through the outgoing optical fiber 3.

As described above, by constituting an optical fiber using the complex photonic crystal 14 in which the photonic crystals 5, 6, and 12 are bonded to each other, a 3-coupler that has been difficult to produce due to complicated alignment of optical axes and matching in a mode shape can be realized with a simple configuration.

Embodiment 3

Figure 4:
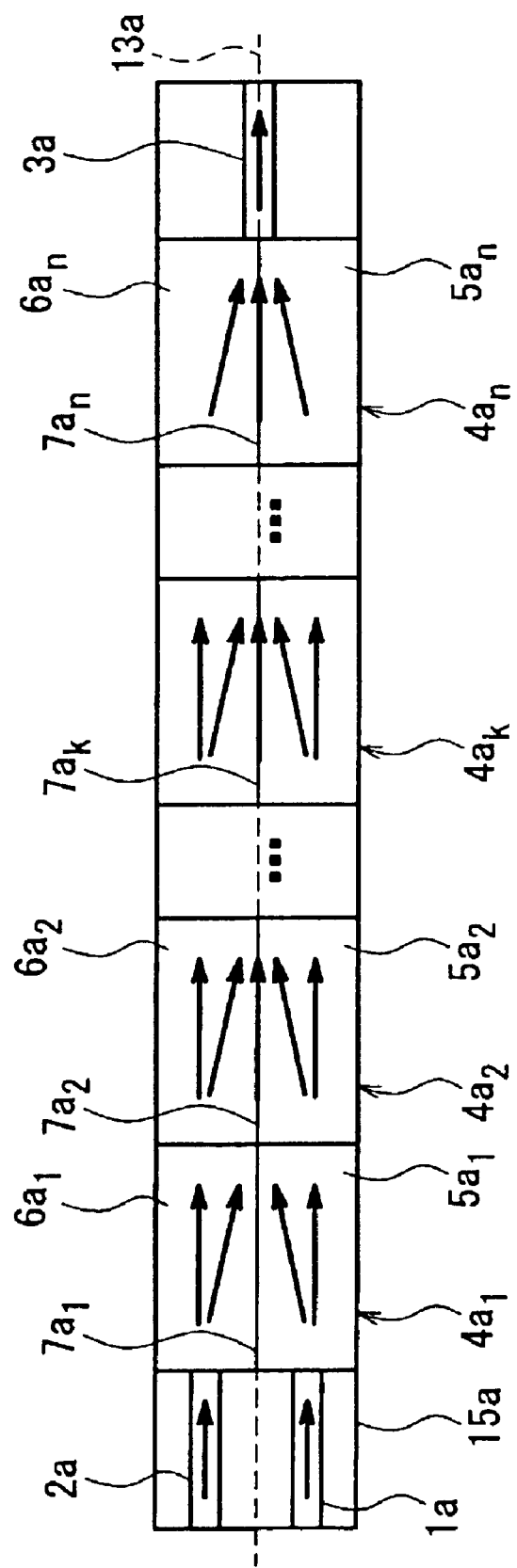
FIG. 4 is a plan view showing a configuration of an optical device of Embodiment 3 according to the present invention.

An optical device of Embodiment 3 according to the present invention will be described with reference to FIG. 4. The optical device of Embodiment 3 is a power coupler for WDM.

The optical device of Embodiment 3 is constituted in such a manner that a plurality of complex photonic crystals $4a_1$ to $4a_n$, each having a lattice structure symmetrical with respect to a boundary face in the same way as in the complex photonic crystal 4 of Embodiment 1, are bonded to each other in a column. More specifically, the complex photonic crystals $4a_1$ to $4a_n$, each having a lattice structure that is symmetrical with respect to a boundary face in the same way as in the complex photonic crystal 4, are placed on a substrate 15a so that they are bonded to each other in a column, and boundary faces $7a_1$ to $7a_n$ thereof are formed on the same surface. The lattice structures of the respective complex photonic crystals $4a_1$ and $4a_n$ are different, so that the wavelength of light (selection light) to be deflected is varied depending upon the complex photonic crystals $4a_1$ to $4a_n$. The complex photonic crystals $4a_1$ to $4a_n$ are composed of photonic crystals $5a_1$ to $5a_n$ and photonic crystals $6a_1$ to $6a_n$, which have lattice structures symmetrical with respect to the boundary faces $7a_1$ to $7a_n$. The direction of one primitive lattice vector of the respective complex photonic crystals $4a_1$ to $4a_n$ is the same as that of the optical axis of an outgoing optical fiber 3a.

The complex photonic crystal $4a_1$ has a lattice structure in which selection light is deflected so as to approach the boundary face $7a_1$ when the selection light is allowed to propagate in the direction of a primitive lattice vector. Similarly, when the selection light is allowed to propagate in the direction of a primitive lattice vector in another complex photonic crystal $4a_k$, the selection light is deflected so as to approach the boundary face $7a_k$. Herein, $1 \leq k \leq n$.

The ingoing optical fibers 1a and 2a are placed on an end face of the complex photonic crystal $4a_1$. An outgoing optical fiber 3a is placed on an end face of the complex photonic crystal $4a_n$, and its optical axis 13a is included in the boundary faces $7a_1$ to $7a_n$.

Light obtained by coupling selection light of all the complex photonic crystals $4a_1$ to $4a_n$ propagates through the ingoing optical fibers 1a and 2a, and is incident upon the complex photonic crystal $4a_1$ in the same direction as that of the primitive lattice vector thereof. Among light incident from the ingoing optical fiber 1a, light with a wavelength of $f_{4a1}$ is deflected in a photonic crystal $5a_1$ of the complex photonic crystal $4a_1$, and travels so as to approach the boundary face $7a_1$. Furthermore, among light incident from the ingoing optical fiber 2a, light with a wavelength of $f_{4a1}$ is deflected in a photonic crystal $6a_1$ of the complex photonic crystal $4a_1$, and travels so as to approach the boundary face $7a_1$. Both light beams are coupled in the vicinity of the boundary face $7a_1$, and the resultant light is incident upon the complex photonic crystal $4a_2$ along the boundary face $7a_2$.

Light other than the selection light travels straight in the complex photonic crystal $4a_1$ along the optical axes of the ingoing optical fibers 1a and 2a, and is incident upon the complex photonic crystal $4a_2$ in the direction of its primitive lattice vector.

Hereinafter, similarly, selection light is deflected to be separated from light traveling along the optical axes of the ingoing optical fibers 1a and 2a in the complex photonic crystal $4a_k$, and coupled to coupled light traveling along the boundary face $7a_k$. Only the selection light of the complex photonic crystal $4a_n$ is incident upon the complex photonic crystal $4a_n$ along the optical axes of the ingoing optical fibers 1a and 2a. This selection light is deflected in the photonic crystals $5a_n$ and $6a_n$ of the complex photonic crystal $4a_n$ so as to approach the boundary face $7a_n$. In the vicinity of the boundary face $7a_n$, light with a wavelength of $f_{4an}$ is coupled to coupled light traveling in the vicinity of the boundary face $7a_n$. The resultant coupled light is output from the end face of the complex photonic crystal $4a_n$, and is incident upon the outgoing optical fiber 3a to propagate therethrough. The optical axis of the outgoing optical fiber 3a is included in the boundary face $7a_n$, and is placed at a position so as to be coupled to light from the complex photonic crystal $4a_n$.

In the above-mentioned complex photonic crystals $4a_1$ to $4a_n$, cylindrical air holes (columnar materials 10) having a radius "r" (0.14 times the wavelength of each selection light) are arranged periodically at a lattice constant "a" (0.54 times the wavelength of selection light) in the direction of two primitive lattice vectors having an inner angle θ of 80° in a thin film core that is a first material 9 (e.g., glass or a polymer) having a refractive index of about 1.3 to 2.0.

As described above, by bonding photonic crystals capable of selectively deflecting a specific wavelength in a mirror symmetry so that the directions of primitive lattice vectors are included in the boundary face, selection light beams incident in the direction of the primitive lattice vectors are deflected so as to be symmetrical with respect the boundary face. By bonding complex photonic crystals with such a structure in a column, a power coupler for WDM dealing with a plurality of wavelengths can be realized.

Embodiment 4

Figure 5:
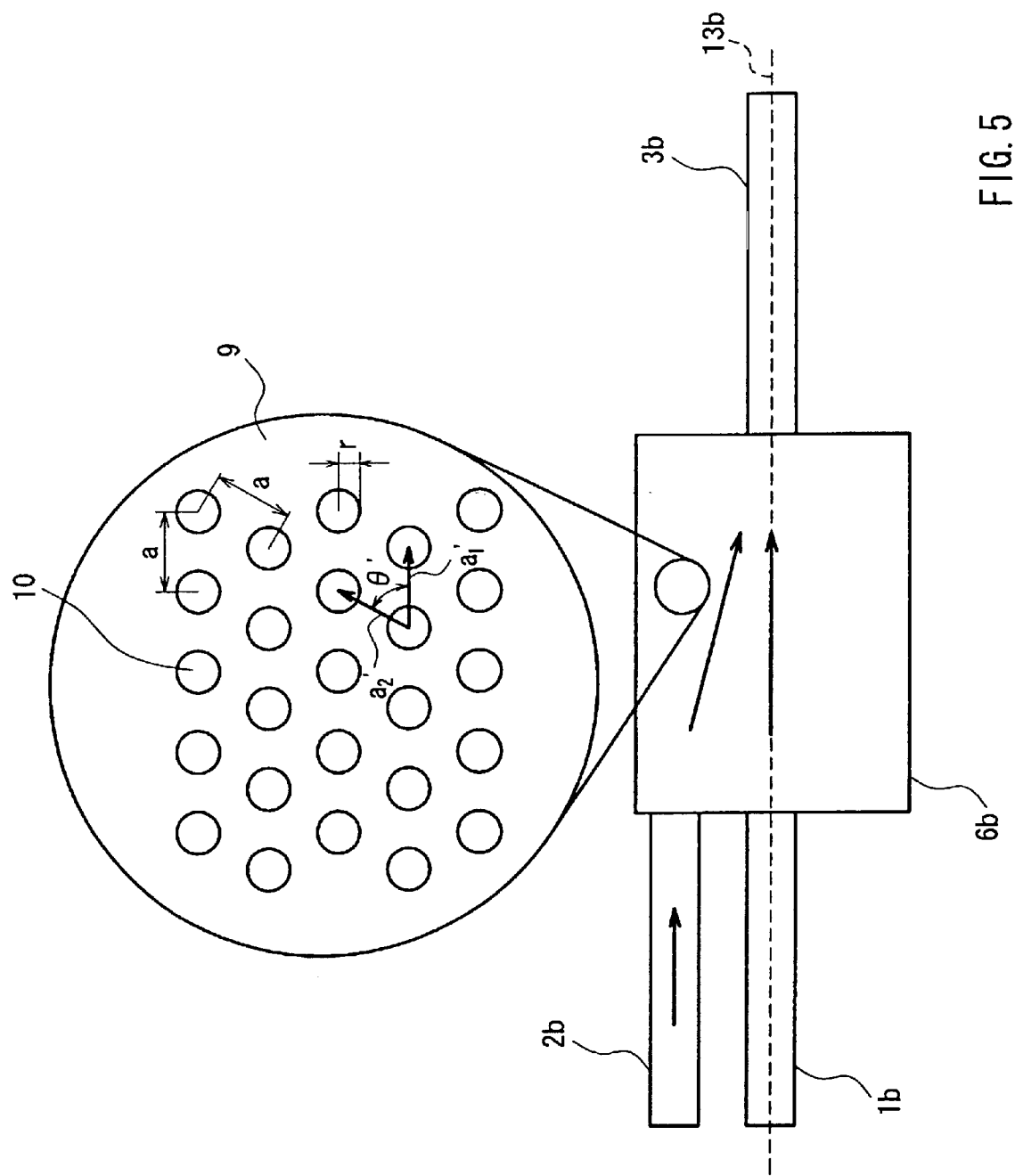
FIG. 5 is a plan view showing a configuration of an optical device of Embodiment 4 according to the present invention.

An optical device of Embodiment 4 according to the present invention will be described with reference to FIG. 5. The optical device of Embodiment 4 is an optical coupler.

The optical device of Embodiment 4 is constituted by using a photonic crystal 6b with a single lattice structure without using a complex photonic crystal having a plurality of lattice structures. The photonic crystal 6b has deflection dispersion characteristics in the same way as in the photonic crystal 6 of Embodiment 1.

Ingoing optical fibers $1b$ and $2b$ are placed on one end face of the photonic crystal $6b$, and an outgoing optical fiber $3b$ is placed on the other end face thereof. Furthermore the ingoing optical fiber $1b$ and the outgoing optical fiber $3b$ share the same optical axis $13b$.

Although light beams with a plurality of wavelengths propagate through the ingoing optical fiber $1b$, selection light of the photonic crystal $6b$ does not propagate therethrough. The selection light of the photonic crystal $6b$ propagates through the ingoing optical fiber $2b$. Light is incident upon the photonic crystal $6b$ from the ingoing optical fibers $1b$ and $2b$ in the direction of primitive lattice vectors. Light incident from the ingoing optical fiber $1b$ travels straight along the optical axis $13b$ without being deflected in the photonic crystal $6b$.

On the other hand, light incident from the ingoing optical fiber $2b$ is deflected so as to approach the optical axis $13b$ in the photonic crystal $6b$. Therefore, the light incident upon the photonic crystal $6b$ from the ingoing optical fiber $1b$ is coupled to the light incident upon the photonic crystal $6b$ from the ingoing optical fiber $2b$ in the photonic crystal $6b$. If the length of the light propagation direction of the photonic crystal $6b$ is set to extend to the position where these light beams cross each other, the coupled light is output from the end face of the photonic crystal $6b$. Since the ingoing optical fiber $1b$ and the outgoing optical fiber $3b$ share the same optical axis, the light output from the photonic crystal $6b$ is incident upon the outgoing optical fiber $3b$ to propagate therethrough.

If the distance between the ingoing optical fibers $1b$ and $2b$ is enlarged, the length of the light propagation direction of the photonic crystal $6b$ must be prescribed to be larger in proportion with the distance.

As described above, an optical coupler can be constituted by using a photonic crystal. The optical coupler with such a structure does not require the alignment of optical axes and matching in a mode shape with high precision. Because of this, an optical coupler can be produced easily.

Embodiment 5

An optical device of Embodiment 5 according to the present invention will be described with reference to FIG. 6. The optical device of Embodiment 5 is a wavelength coupler for WDM.

The optical device of Embodiment 5 has a configuration in which a plurality of photonic crystals having deflection dispersion characteristics in the same way as in the photonic crystal $6b$ of Embodiment 4 are bonded to each other in a column. The photonic crystals $6c_1$ to $6c_n$ are placed on a substrate $15c$ so as to be bonded to each other in a column. The lattice structures of the respective photonic crystals $6c_1$ to $6c_n$ are different from each other, so that the wavelength of light (selection light) to be deflected is varied.

An ingoing optical fiber $1c$ is placed on an end face of the photonic crystal $6c_1$, and a photonic crystal $6c_2$ (not shown) is bonded to the other end face of the photonic crystal $6c_1$. Thus, the photonic crystals $6c_1$ to $6c_n$ are bonded successively in a column. An outgoing optical fiber $3c$ is placed on an end face of the photonic crystal $6c_n$. The ingoing optical fiber $1c$ and the outgoing optical fiber $3c$ share an optical axis $13c$. Furthermore, ingoing optical fibers $2c_1$ to $2c_n$ are placed on the side of the respective photonic crystals $6c_1$ to $6c_n$.

Light propagating through the ingoing optical fiber $1c$ is incident upon the photonic crystal $6c_1$ in the direction of a primitive lattice vector. The light propagating through the ingoing optical fiber $1c$ is coupled light of a plurality of light beams having different wavelengths, which is not deflected in any of the photonic crystals $6c_1$ to $6c_n$. Therefore, the light incident upon the photonic crystal $6c_1$ from the ingoing optical fiber $1c$ travels straight along the optical axis $13c$.

Light propagating through the ingoing optical fiber $2c_1$ also is incident in the direction of a primitive lattice vector from the side of the photonic crystal $6c_1$, whereas light propagating through the ingoing optical fiber $2c_1$ is selection light of the photonic crystal $6c_1$. Therefore, the light propagating through the ingoing optical fiber $2c_1$ is deflected, tilting at an angle of about 10° with respect to the optical axis $13c$. Because of this, the light incident from the ingoing optical fiber $1c$ is coupled to the light incident from the ingoing optical fiber $2c_1$ in the photonic crystal $6c_1$. The coupled light travels along the optical axis $13c$, and is incident upon the photonic crystal $6c_2$ (not shown).

Figure 6:
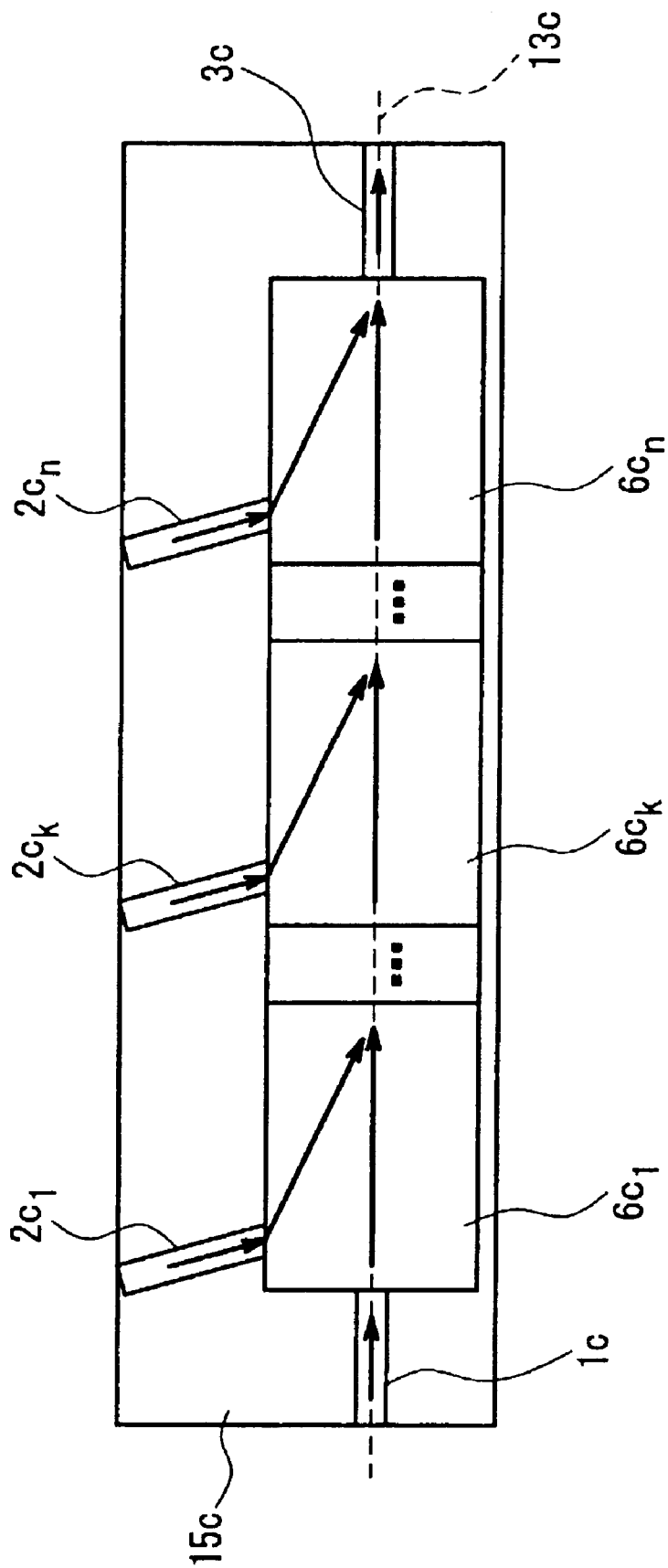
FIG. 6 is a plan view showing a configuration of an optical device of Embodiment 5 according to the present invention.

In FIG. 6, the direction of the optical axis of the ingoing optical fiber $2c_1$ is different from the direction of the primitive lattice vector in the photonic crystal $6c_1$. However, light may be set so as to be incident in the direction of the primitive lattice vector due to refraction at a time of incidence.

The length of the light propagation direction of the photonic crystal $6c_1$ is determined so that the position where the light is coupled becomes an end face. The selection light is deflected (deflection angle: about 10°) with respect to the direction of the primitive lattice vector (matched with the optical axis $13c$). Therefore, the length of the light propagation direction of the photonic crystal $6c_1$ may be set to be larger than a value obtained by dividing the distance from the optical axis $13c$ to the side of the photonic crystal $6c_1$ by tan (deflection angle).

Hereinafter, similarly, light propagating through the ingoing optical fiber $2c_k$ is incident in the direction of the primitive lattice vector from the side of the photonic crystal $6c_k$, which is selection light of the photonic crystal $6c_k$. Light incident upon the photonic crystal $6c_k$ from the ingoing optical fiber $2c_k$ is deflected and travels toward the optical axis $13c$. Coupled light incident upon the photonic crystal $6c_k$ from the photonic crystal $6c_{k-1}$ in the previous stage travels straight along the optical axis $13c$. These light beams are coupled in the photonic crystal $6c_k$, and the coupled light is incident upon the photonic crystal $6c_{k+1}$ in the subsequent stage along the optical axis $13c$. More specifically, in the respective photonic crystals $6c_1$ to $6c_n$, selection light of the respective photonic crystals $6c_1$ to $6c_n$ is coupled to the light incident along the optical axis from the previous stage. All the coupled light beams are output from the end face of the photonic crystal $6c_n$ in the final stage, and incident upon the outgoing optical fiber $3c$ to propagate therethrough.

As described above, a wavelength couple for WDM constituted by using a photonic crystal does not require the alignment of optical axes and matching in a mode shape with high precision. Because of this, the wavelength coupler can be produced easily.

Embodiment 6

Figure 7:
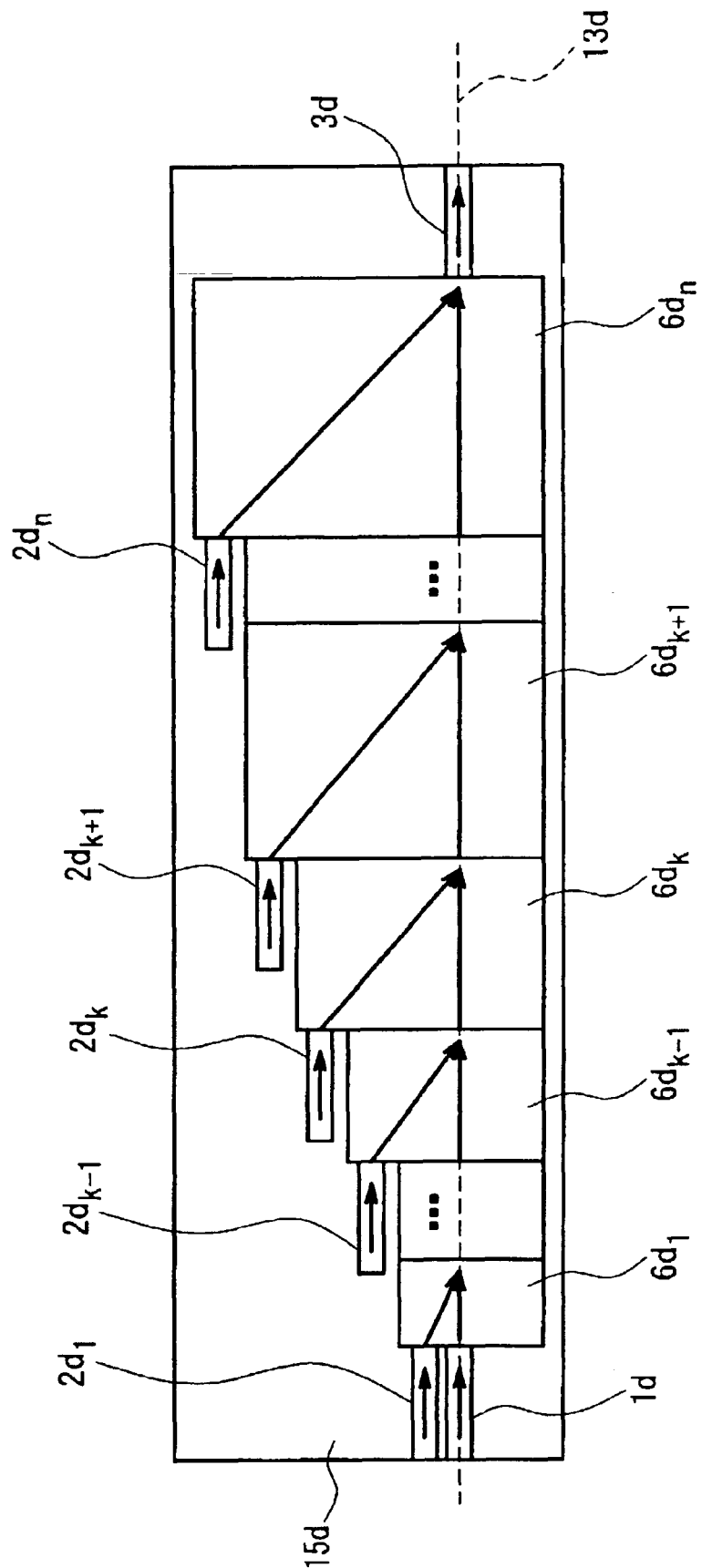
FIG. 7 is a plan view showing a configuration of an optical device of Embodiment 6 according to the present invention.

An optical device of Embodiment 6 according to the present invention will be described with reference to FIG. 7. The optical device of Embodiment 6 is a wavelength coupler for WDM, which is different from Embodiment 5 in a setting position of an optical fiber for allowing light to be incident, but has the same basic configuration as that of Embodiment 5.

The optical device of Embodiment 6 has a configuration in which a plurality of photonic crystals having deflection dispersion characteristics in the same way as the photonic crystal $6b$ of Embodiment 4 are bonded to each other in a column. The photonic crystals $6d_1$ to $6d_n$ are placed on a substrate 15d so as to be bonded to each other in a column. The lattice structures of the respective photonic crystals $6d_1$ to $6d_n$ are different from each other, so that the wavelength of light (selection light) to be deflected is varied.

An ingoing optical fiber 1d is placed on an end face of the photonic crystal $6d_1$, and a photonic crystal $6d_2$ (not shown) is bonded to the other end face of the photonic crystal $6d_1$. Thus, the photonic crystals $6d_1$ to $6d_n$ are bonded successively in a column, and an outgoing optical fiber 3d is placed on the end face of the photonic crystal $6d_n$ in the final stage. The ingoing optical fiber 1d and the outgoing optical fiber 3d share an optical axis 13d. Furthermore, the length of the photonic crystals $6d_1$ to $6d_n$ in the direction vertical to the optical axis 13d is increased toward a later stage. Furthermore, one side of the respective photonic crystals $6d_1$ to $6d_n$ is on the same face. Because of this, a part of the end face of the photonic crystal $6d_k$ is not in contact with the photonic crystal $6d_{k-1}$ in the previous stage. An ingoing optical fiber $2d_k$ is placed on this part. Since the photonic crystal $6d_1$ is in the first stage, ingoing optical fibers 1d and $2d_n$ are placed thereon.

Since the ingoing optical fibers $2d_1$ to $2d_n$ are placed in parallel with the optical axis 13d, the optical device of Embodiment 6 can be decreased in a side width.

Light propagating through the ingoing optical fiber 1d is incident upon the photonic crystal $6d_1$ in the direction of a primitive lattice vector. Light propagating through the ingoing optical fiber 1d has a wavelength that does not allow the light to be deflected in any of the photonic crystals $6d_1$ to $6d_n$. Therefore, the light incident upon the photonic crystal $6d_1$ from the ingoing optical fiber 1d travels straight along the optical axis 13d.

Light propagating through the ingoing optical fiber $2d_1$ also is incident upon the photonic crystal $6d_1$ in the direction of a primitive lattice vector, which is selection light of the photonic crystal $6d_1$. Therefore, the light propagating through the ingoing optical fiber $2d_1$ is deflected. Because of this, the light incident from the ingoing optical fiber 1d is coupled to the light incident from the ingoing optical fiber $2d_1$ in the photonic crystal $6d_1$. The coupled light travels along the optical axis 13d and is incident upon a photonic crystal in the subsequent stage.

The length of the light propagation direction of the photonic crystal $6d_1$ is determined so that the position where the light is coupled becomes an end face. The selection light is deflected (deflection angle: about 10°) with respect to the direction of the primitive lattice vector (matched with the optical axis 13c). Therefore, the length of the light propagation direction of the photonic crystal $6d_1$ may be set to be larger than a value obtained by dividing the distance from the optical axis 13c to the setting position of the ingoing optical fiber $2d_1$ by tan (deflection angle).

Light propagating through the ingoing optical fiber $2d_k$ is incident in the direction of the primitive lattice vector from the side of the photonic crystal $6d_k$, which is selection light of the photonic crystal $6d_k$. Light incident upon the photonic crystal $6d_k$ from the ingoing optical fiber $2d_k$ is deflected and travels toward the optical axis 13d. Coupled light incident upon the photonic crystal $6d_k$ from the photonic crystal $6d_{k-1}$ in the previous stage travels straight along the optical axis 13d. These light beams are coupled in the photonic crystal $6d_k$, and the coupled light is incident upon the photonic crystal $6d_{k+1}$ in the subsequent stage along the optical axis 13d. More specifically, in the respective photonic crystals $6d_1$ to $6d_n$, selection light of the respective photonic crystals $6d_1$ to $6d_n$ is coupled to the light incident along the optical axis 13d from the previous stage. All the coupled light beams are output from the end face of the photonic crystal $6d_n$ in the final stage, and incident upon the outgoing optical fiber 3d to propagate therethrough.

As described above, a wavelength couple for WDM constituted by using a photonic crystal does not require the alignment of optical axes and matching in a mode shape with high precision. Because of this, the wavelength coupler can be produced easily.

Embodiment 7

Figure 8:
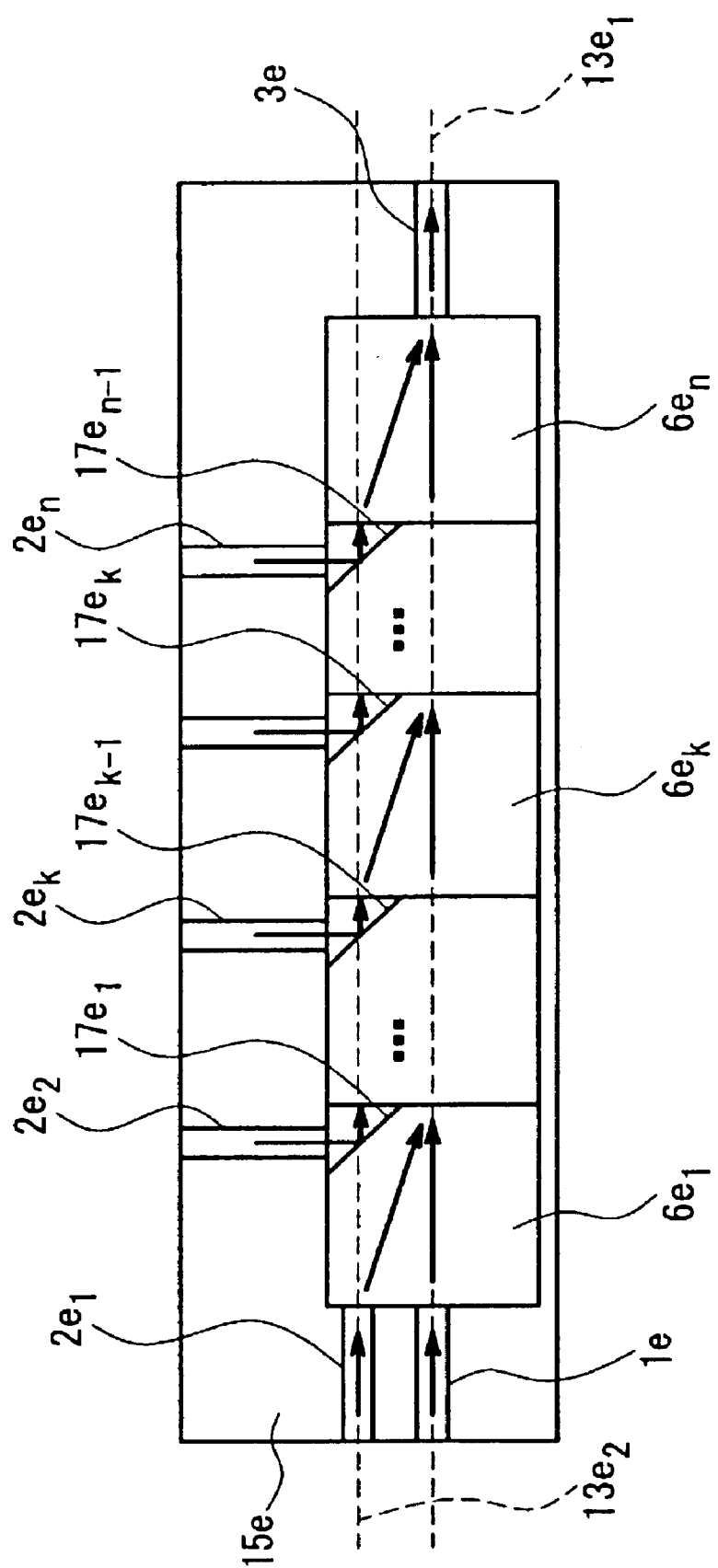
FIG. 8 is a plan view showing a configuration of an optical device of Embodiment 7 according to the present invention.

An optical device of Embodiment 7 according to the present invention will be described with reference to FIG. 8. The optical device of Embodiment 7 is a wavelength coupler for WDM, which is different from Embodiment 5 in the setting position of an optical fiber for allowing light to be incident but has the same basic configuration as that of Embodiment 5.

The optical device of Embodiment 7 uses photonic crystals $6e_1$ to $6e_n$ having different deflection dispersion characteristics in a multi-stage in the same way as in the optical device of Embodiment 5, and allows light beams with different wavelengths to be coupled in each photonic crystal. Furthermore, in the optical device of Embodiment 7, light is allowed to be incident upon the photonic crystals $6e_2$ to $6e_n$ from the ingoing optical fibers $2e_2$ to $2e_n$ by using a mirror.

The optical device has a configuration in which a plurality of photonic crystals $6e_1$ to $6e_n$ having deflection dispersion characteristics in the same way as in the photonic crystal 6b of Embodiment 4 are bonded to each other in a column. The photonic crystals $6e_1$ to $6e_n$ are placed on a substrate 15e so as to be bonded to each other in a column. The lattice structures of the respective photonic crystals $6e_1$ to $6e_n$ are different from each other, so that the wavelength of light (selection light) to be deflected is varied.

An ingoing optical fiber 1e is placed on an end face of the photonic crystal $6e_1$, and a photonic crystal $6e_2$ (not shown) is bonded to the other end face of the photonic crystal $6e_1$. Thus, the photonic crystals $6e_1$ to $6e_n$ are bonded successively in a column, and an outgoing optical fiber 3e is placed on the end face of the photonic crystal $6e_n$ in the final stage. The ingoing optical fiber 1e and the outgoing optical fiber 3e share an optical axis $13e_n$. An ingoing optical fiber $2e_1$ is placed on the end face of the photonic crystal $6e_1$.

The photonic crystals $6e_1$ to $6e_{n-1}$ have chamfered portions $17e_1$ to $17e_{n-1}$ where one corner of an end face on an output side is cut off substantially at an angle of 45° with respect to the optical axis $13e_1$. A mirror is placed on the respective chamfered portions $17e_1$ to $17e_{n-1}$. Ingoing optical fibers $2e_2$ to $2e_n$ are placed in the direction vertical to the optical axis $13e_1$. The ingoing optical fibers $2e_2$ to $2e_n$ are placed so that light output therefrom is reflected from a mirror and incident upon the photonic crystals $6e_2$ to $6e_n$ in the direction of a primitive lattice vector. These light beams travel along an optical axis $13e_2$ of the ingoing optical fiber $2e_1$.

As described above, in the optical device of Embodiment 7, even if the ingoing optical fibers $2e_2$ to $2e_n$ are placed perpendicularly, selection light can be incident in the direction of a primitive lattice vector of the respective photonic crystals $6e_2$ to $6e_n$ by the mirror. By setting the refractive index on the periphery of the chamfered portions $17e_1$ to $17e_{n-1}$ and the refractive index of the photonic crystals $6e_1$ to $6e_{n-1}$ so that total reflection occurs, total reflection with a low loss can be used without using a mirror.

Light propagating through the ingoing optical fiber 1e is incident upon the photonic crystal $6e_1$. Light propagating through the ingoing optical fiber 1e has a wavelength that does not allow the light to be deflected in any of the photonic crystals $6e_1$, to $6e_n$. Therefore, the light incident upon the photonic crystal $6e_1$ from the ingoing optical fiber $1e$ travels straight along the optical axis $13e_1$.

Light propagating through the ingoing optical fiber $2e_1$ also is incident upon the photonic crystal $6e_1$ in the direction of a primitive lattice vector, which is selection light of the photonic crystal $6e_1$. Therefore, the light propagating through the ingoing optical fiber $2e_1$ is deflected so as to approach the optical axis $13e$. Because of this, the light incident from the ingoing optical fiber $1e_1$ is coupled to the light incident from the ingoing optical fiber $2e_1$ in the photonic crystal $6e_1$. The coupled light travels along the optical axis $13e_1$ and is incident upon a photonic crystal $6e_2$ (not shown) in the subsequent stage.

The length of the light propagation direction of the photonic crystal $6e_1$ is determined so that the position where the light is coupled becomes an end face. The selection light is deflected (deflection angle: about 10°) with respect to the direction of the primitive lattice vector (matched with the optical axis $13e_2$). Therefore, the length of the light propagation direction of the photonic crystal $6e_1$ may be set to be larger than a value obtained by dividing the distance from the optical axis $13e_2$ to the setting position of the ingoing optical fiber $2e_1$ by tan (deflection angle).

Similarly, selection light of the photonic crystal $6e_k$ is output from the ingoing optical fiber $2e_k$. The output light is reflected from the mirror of the chamfered portion $17e_{k-1}$ of the photonic crystal $6e_{k-1}$ and is incident upon the photonic crystal $6e_k$ along the optical axis $13e_2$ in the direction of a primitive lattice vector. This incident light is deflected in the photonic crystal $6e_k$, and is coupled to coupled light from the previous stage, which travels straight and is incident upon the photonic crystal $6e_k$ along the optical axis $13e_1$, so as to be output.

As described above, selection light is coupled successively in each of the photonic crystals $6e_1$ to $6e_n$, and the coupled light is output from the photonic crystal $6e_n$ in the final stage, and is incident upon the outgoing optical fiber $3e$ to propagate therethrough.

As described above, a wavelength coupler for WDM constituted by using a photonic crystal does not require the alignment of optical axes and matching in a mode shape with high precision. Because of this, the wavelength coupler can be produced easily.

According to the wavelength couplers for WDM of Embodiments 5 to 7 as described above, in each photonic crystal, the specific wavelength (selection wavelength) of light, which allows the light to be deflected, is determined based on the refractive index periodic structure of a photonic crystal. Therefore, selection light of each complex photonic crystal can be controlled. Furthermore, the order of wavelengths to be coupled can be controlled arbitrarily, depending upon the order in a column of the complex photonic crystals. Thus, an arbitrary wavelength can be coupled/added in an arbitrary order in WDM dealing with a plurality of wavelengths.

Furthermore, although a plurality of complex photonic crystals are bonded to each other in a column, the optical devices of Embodiments 5 to 7 also may be obtained by forming columnar materials, which have a varying radius and periodic structure for a predetermined distance in the light propagation direction, in one first material to obtain a different periodic structure.

Embodiment 8

Figure 9:
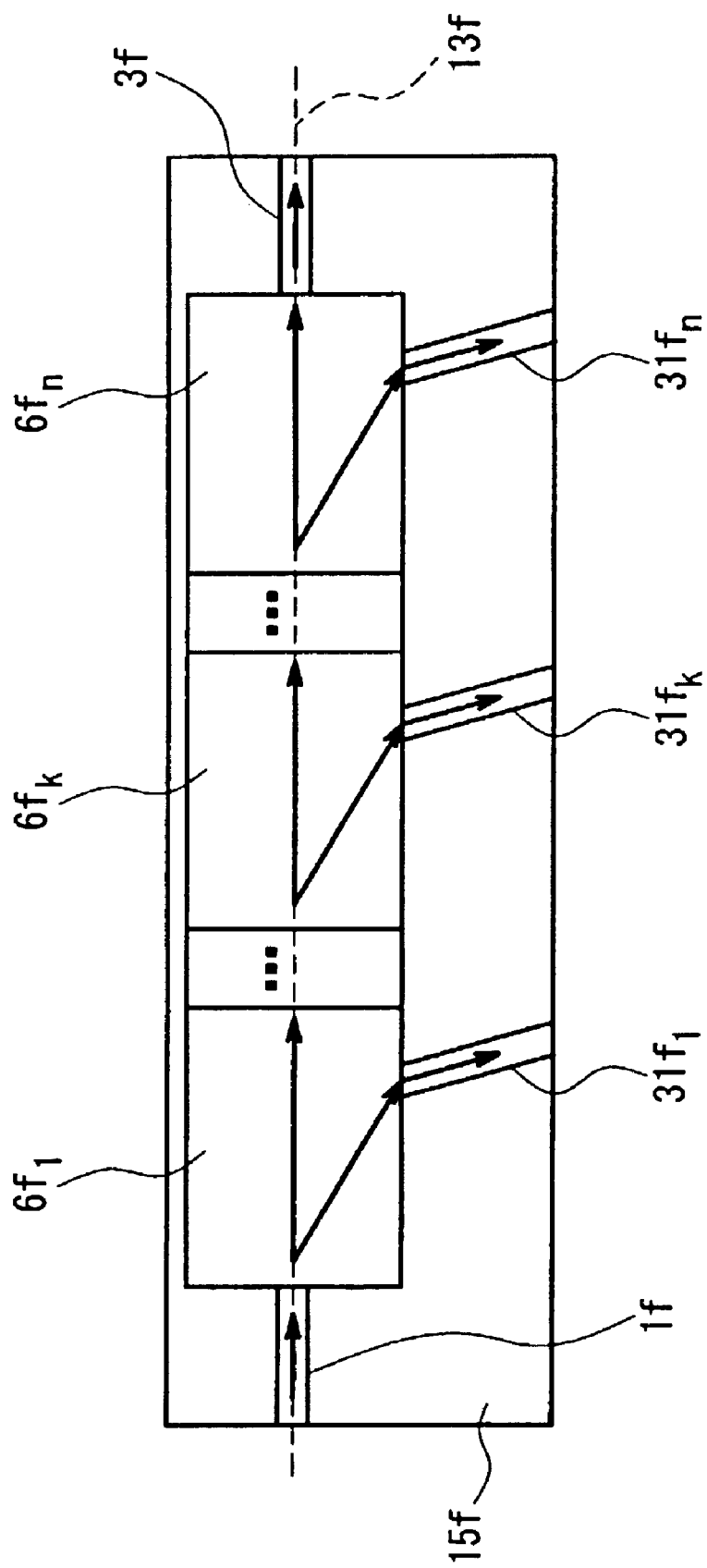
FIG. 9 is a plan view showing a configuration of an optical device of Embodiment 8 according to the present invention.

An optical device of Embodiment 8 according to the present invention will be described with reference to FIG. 9. The optical device of Embodiment 8 is an optical filter for WDM. The optical device of Embodiment 8 has a configuration in which photonic crystals having different deflection dispersion characteristics are bonded to each other in a multi-stage in the same way as in Embodiment 5, and light beams having a plurality of wavelength components are separated on the wavelength basis.

In the optical device of Embodiment 8, a plurality of photonic crystals having deflection dispersion characteristics in the same way as in the photonic crystal $6b$ of Embodiment 4 are placed on a substrate $15f$ so as to be bonded to each other in a column. The lattice structures of respective photonic crystals $6f_1$ to $6f_n$ are different from each other, and the wavelength of light (selection light) to be deflected is varied.

An ingoing optical fiber $1f$ is placed on an end face of a photonic crystal $6f_1$, and an outgoing optical fiber $3f$ is placed on an end face of a photonic crystal $6f_n$ in the final stage. An optical axis $13f$ of the ingoing optical fiber $1f$ and the outgoing optical fiber $3f$ is in the same direction as that of the primitive lattice vectors of the respective photonic crystals $6f_1$ to $6f_n$. Outgoing optical fibers $31f_1$ to $31f_n$ for propagating separated light are placed on a side of the respective photonic crystals $6f_1$ to $6f_n$.

Coupled light of light beams with a plurality of different wavelengths propagates from the ingoing optical fiber $1f$, and includes selection light of the respective photonic crystals $6f_1$ to $6f_n$. When the coupled light is incident upon the photonic crystal $6f_1$ from the ingoing optical fiber if along the optical axis $13f$, the selection light of the photonic crystal $6f_1$ in the coupled light is deflected in a traveling direction with respect to the optical axis $13f$. The remaining coupled light travels in the traveling direction along the optical axis $13f$.

The deflected selection light is output from the side of the photonic crystal $6f_1$ and is incident upon the outgoing optical fiber $31f_1$. The coupled light other than the selection light is incident upon the photonic crystal in the subsequent stage along the optical axis $13f$.

Similarly, selection light of the photonic crystal $6f_k$ is separated in the photonic crystal $6f_k$, and is incident upon the outgoing optical fiber $31f_k$ to propagate therethrough. The remaining light is incident upon the photonic crystal in the subsequent stage along the optical axis $13f$ This is continued until the photonic crystal $6f_n$ in the final stage.

Regarding output positions of selection light and non-selection light in the respective photonic crystals $6f_1$ to $6f_n$, non-selection light propagates along the optical axis $13f$, so that the outgoing optical fiber $3f$ may be connected to the output end on the optical axis $13f$. However, since selection light is deflected by about 10° from the first primitive lattice vector (matched with the optical axis), the output position is determined based on the length of the light propagation direction of the respective photonic crystals $6f_1$ to $6f_n$. In the case where light is output from the side, the length of the photonic crystals $6f_1$ to $6f_n$ may be set to such a degree that selection light does not reach the bonding surface in a column.

Figure 10:
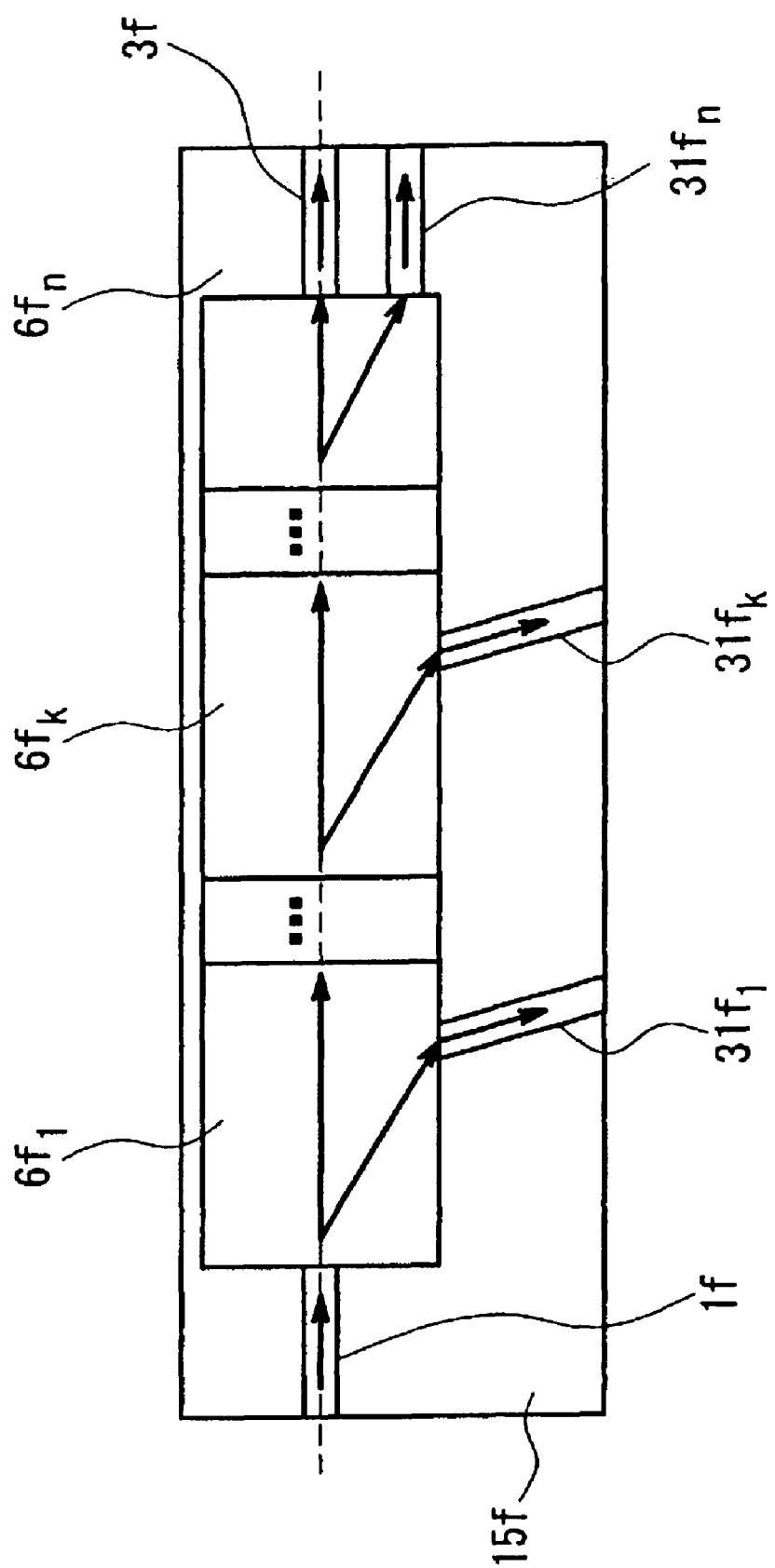
FIG. 10 is a plan view showing another configuration of an optical device of Embodiment 8 according to the present invention.

Furthermore, as shown in FIG. 10, in the photonic crystal $6f_n$ in the final stage, the outgoing optical fiber $31f_n$ may be placed on an end face instead of a side so as to allow separated selection light to be output from the end face. In this case, the photonic crystal $6f_n$ can be made shorter than other two-dimensional photonic crystals.

As described above, light can be separated on the wavelength basis in accordance with the order in a column of the photonic crystals $6f_1$ to $6f_n$ constituting a complex photonic crystal, and the order for separating a wavelength can be controlled arbitrarily. Therefore, an arbitrary wavelength can be separated in an arbitrary order in WDM dealing with a plurality of wavelengths.

Embodiment 9

Figure 11:
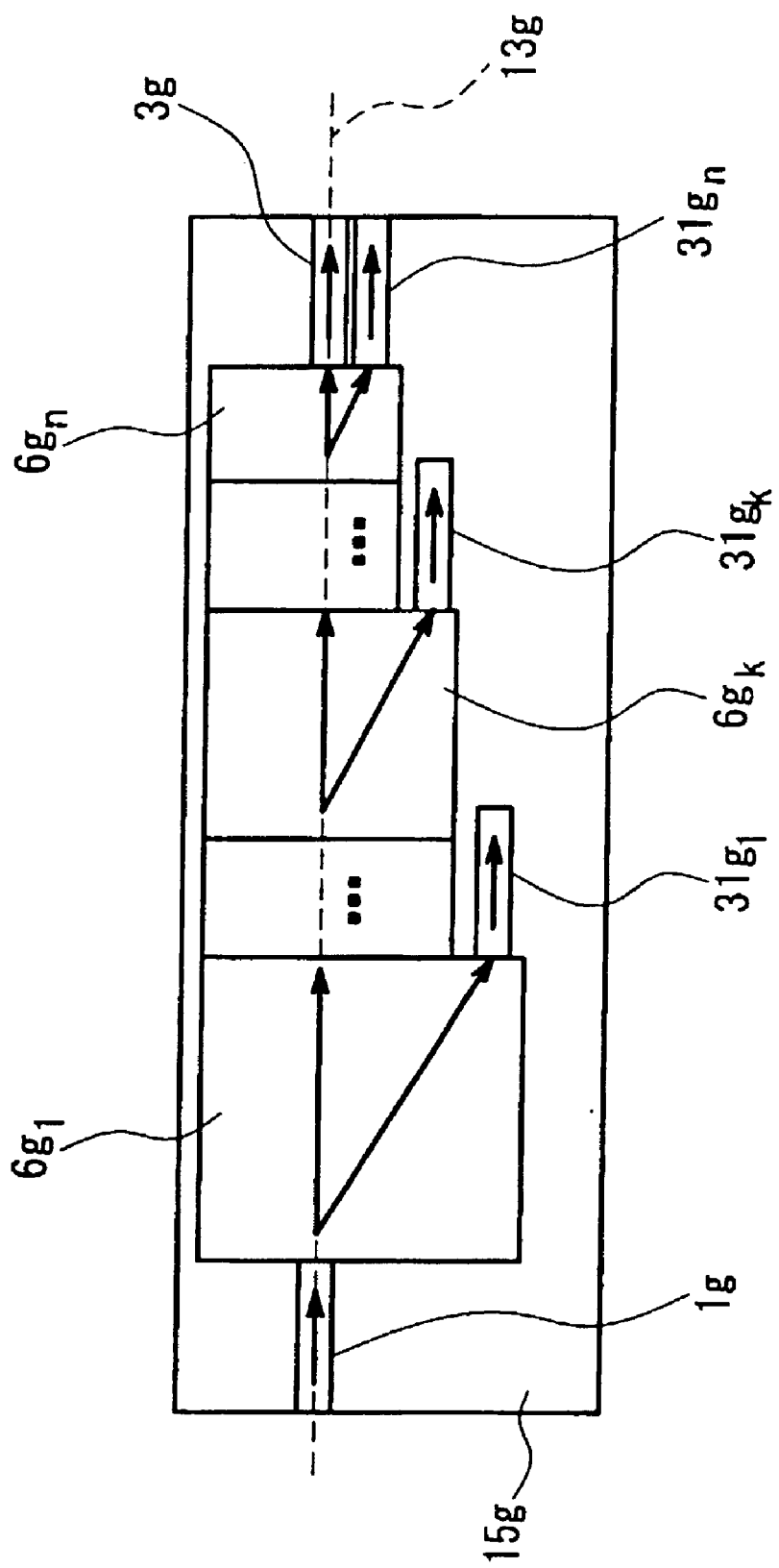
FIG. 11 is a plan view showing a configuration of an optical device of Embodiment 9 according to the present invention.

An optical device of Embodiment 9 according to the present invention will be described with reference to FIG. 11. The optical device of Embodiment 9 is an optical filter for WDM, which is different from Embodiment 8 in the setting position of an optical fiber for outputting light selection light to be incident but has the same basic configuration as that of Embodiment 8.

The optical device of Embodiment 9 has a configuration in which a plurality of photonic crystals having deflection dispersion characteristics in the same way as in the photonic crystal $6b$ of Embodiment 4 are bonded to each other in a column. Photonic crystals $6g_1$ to $6g_n$ are placed on a substrate $15g$ so as to be bonded to each other in a column. The lattice structures of the photonic crystals $6g_1$ to $6g_n$ are different from each other, and the wavelength of light (selection light) to be deflected is varied.

An ingoing optical fiber $1g$ is placed on an end face of the photonic crystal $6g_1$, and the photonic crystal $6g_2$ (not shown) is bonded to the other end face of the photonic crystal $6g_1$. Similarly, the photonic crystals $6g_1$ to $6g_n$ are bonded successively in a column, and an outgoing optical fiber $3g$ is placed on an end face of the photonic crystal $6g_n$ in the final stage. The optical axis $13g$ of the ingoing optical fiber $1g$ and the outgoing optical fiber $3g$ is in the same direction as that of the primitive lattice vectors of the respective photonic crystals $6g_1$ to $6g_n$.

Furthermore, the length of the respective photonic crystals $6g_1$ to $6g_n$. in the direction vertical to the optical axis $13g$ is decreased toward a later stage. Furthermore, one side of the respective photonic crystals $6g_1$ to $6g_1$ is on the same face. Because of this, a part of the end face of the photonic crystal $6g_k$ is not in contact with the photonic crystal in the subsequent stage. An outgoing optical fiber $31g_k$ is placed on this part. Since the photonic crystal $6g_n$ is in the final stage, the outgoing optical fibers $3g_n$ and $31g_n$ are placed on the photonic crystal $6g_n$.

When coupled light of light beams with a plurality of different wavelengths is incident upon the photonic crystal $6g_1$ from the ingoing optical fiber $1g$ in the direction of a primitive lattice vector, selection light of the photonic crystal $6g_1$ in the coupled light is deflected with respect to the optical axis $13g$. The remaining coupled light travels straight along the optical axis $13g$.

The deflected light is output from the end face of the photonic crystal $6g_1$, and is incident upon the outgoing optical fiber $31g_1$ to propagate therethrough. The remaining coupled light other than the selection light is incident upon the photonic crystal in the subsequent stage along the optical axis $13g$.

Similarly, selection light of the photonic crystal $6g_k$ is separated in the photonic crystal $6g_k$, and is incident upon the outgoing optical fiber $31g_k$ to propagate therethrough. The remaining light is incident upon the photonic crystal $6g_{k+1}$ in the subsequent stage along the optical axis $13f$. This is continued until the photonic crystal $6f_n$ in the final stage.

The refractive index of a first material 9 constituting the photonic crystal is set to be about 1.5 to 1.7. The photonic crystal is produced, for example, by arranging columnar materials 10, which are cylindrical air holes with a radius "r" of 0.08 to 0.3 times the wavelength of selection light, in a slab of $SiO_2$ or a polymer periodically at a lattice constant "a" (0.4 to 0.6 times the wavelength of selection light) in the direction of two primitive lattice vectors having an inner angle θ of 65° to 85°.

Since the selection light is deflected by about 10° from the direction of a primitive lattice vector (matched with an optical axis), the output position is determined based on the length of the light propagation direction of the photonic crystals $6g_1$ to $6g_n$. Therefore, the setting positions of the outgoing optical fibers $31g_1$ to $31g_n$ are determined based on the length of the light propagation direction of the photonic crystals $6g_1$ to $6g_n$.

Embodiment 10

Figure 12:
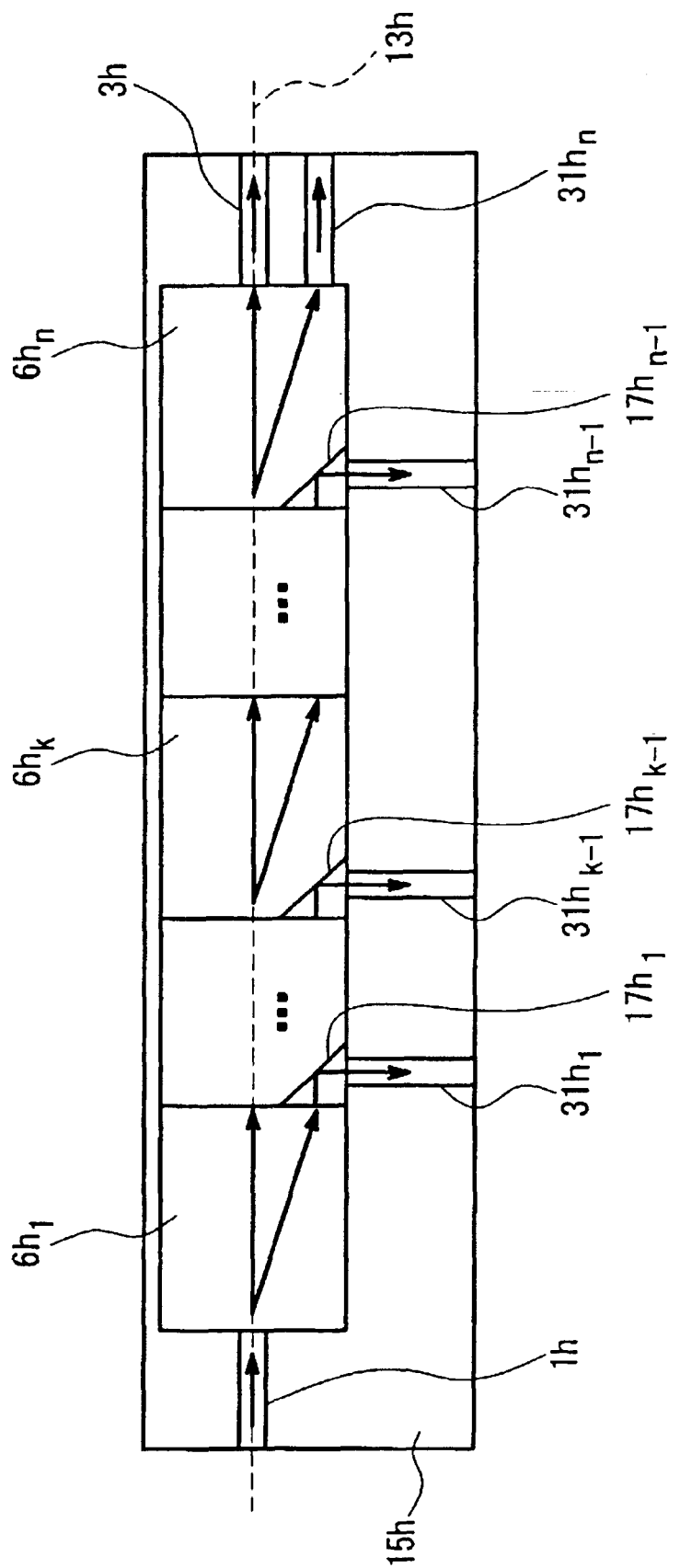
FIG. 12 is a plan view showing a configuration of an optical device of Embodiment 10 according to the present invention.

An optical device of Embodiment 10 according to the present invention will be described with reference to FIG. 12. The optical device of Embodiment 10 is an optical filter for WDM, which is different from Embodiment 8 in the setting position of an optical fiber for outputting selection light but has the same basic configuration as that of Embodiment 8.

The optical device of Embodiment 10 uses photonic crystals $6h_1$ to $6h_n$ having different wavelength dispersion characteristics in a multi-stage in the same way as in the optical device of Embodiment 8, and allows light with different wavelengths to be taken on the basis of each photonic crystal. Furthermore, light taken from the respective photonic crystals $6h_1$ to $6h_n$ is allowed to be incident upon outgoing optical fibers $31h_1$ to $31h_n$ by using mirrors provided for the photonic crystals $6h_1$ to $6h_n$.

In the optical device of Embodiment 10, a plurality of photonic crystals $6h_1$ to $6h_n$ having deflection dispersion characteristics in the same way as in the photonic crystal $6b$ of Embodiment 4 are formed on a substrate $15h$ so as to be bonded to each other in a column. The lattice structures of the photonic crystals $6h_1$ to $6h_n$ are different from each other, so that the wavelength of light (selection light) to be deflected is varied.

An ingoing optical fiber $1h$ is placed on an end face of the photonic crystal $6h_1$, and the photonic crystal $6h_2$ (not shown) is bonded to the other end face of the photonic crystal $6h_1$. Similarly, the photonic crystals $6h_1$ to $6h_n$ are bonded successively in a column, and an outgoing optical fiber $3h$ and an outgoing optical fiber $31h_n$ are placed on an end face of the photonic crystal $6h_n$ in the final stage. An optical axis $13h$ of the ingoing optical fiber $1h$ and the outgoing optical fiber $3h$ is the same as the direction of primitive lattice vectors of the photonic crystals $6h_1$ to $6h^n$.

The photonic crystals $6h_2$ to $6h_n$ of Embodiment 10 have chamfered portions $17h_1$ to $17h_{n-1}$ where one corner of an end face on an input side is cut off substantially at an angle of 45° with respect to the optical axis $13h$. A mirror is placed on the respective chamfered portions $17h_1$ to $17h_{n-1}$. Outgoing optical fibers $31h_2$ to $31h_{n-1}$ are placed in the direction vertical to the optical axis $13h$. Deflected light output from end faces of the photonic crystals $6h_1$ to $6h_{n-1}$ is reflected from the mirrors of the chamfered portions $17h_1$ to $17h_{n-1}$ and incident upon the outgoing optical fibers $31h_1$ to $31h_{n-1}$.

When coupled light including light beams having a plurality of wavelengths is incident upon the photonic crystal $6h_1$ from the ingoing optical fiber $1h$ in the direction of a primitive lattice vector, selection light of the photonic crystal $6h_1$ in the coupled light is deflected with respect to the optical axis $13h$. The remaining coupled light travels straight along the optical axis $13h$.

The deflected light is output from the end face of the photonic crystal $6h_1$, reflected from the mirror of the chamfered portion $17h_1$, and incident upon the outgoing optical fiber $31h_1$. The remaining coupled light other than the selection light is incident upon the photonic crystal in the subsequent stage along the optical axis $13h$. In the photonic crystal $6h_2$ (not shown), the selection light is deflected to be separated from the coupled light, and the remaining coupled light travels straight to be incident upon the subsequent photonic crystal.

Similarly, the deflected selection light output from the end face of the photonic crystal $6h_{k-1}$ is reflected from the mirror of the chamfered portion $17h_{k-1}$, and incident upon the outgoing optical fiber $31h_{k-1}$. The remaining coupled light other than the selection light is incident upon the photonic crystal $6h_k$ along the optical axis $13h$. In the photonic crystal $6h_k$, the selection light is deflected to be separated from the coupled light, and the remaining coupled light travels straight to be incident upon the subsequent photonic crystal.

As described above, selection light is separated successively on the basis of the respective photonic crystals $6h_1$ to $6h_n$, and the deflected selection light output from the photonic crystal $6h_n$ in the final stage is directly incident upon the outgoing optical fiber $31h_n$.

Thus, in the optical device of Embodiment 10, even if the outgoing optical fibers $31h_1$ to $31h_{n-1}$ are placed in the direction vertical to the optical axis $13h$, selection light is allowed to be incident in the direction of a primitive lattice vector of the respective photonic crystals $6h_2$ to $6h$ by the mirror. By setting the refractive index on the periphery of the chamfered portions $17h_1$ to $17h_{n-1}$ and the refractive index of the photonic crystals $6h_2$ to $6h_n$ so that total reflection occurs, total reflection with a low loss can be used without using a mirror.

Embodiment 11

Figure 13:
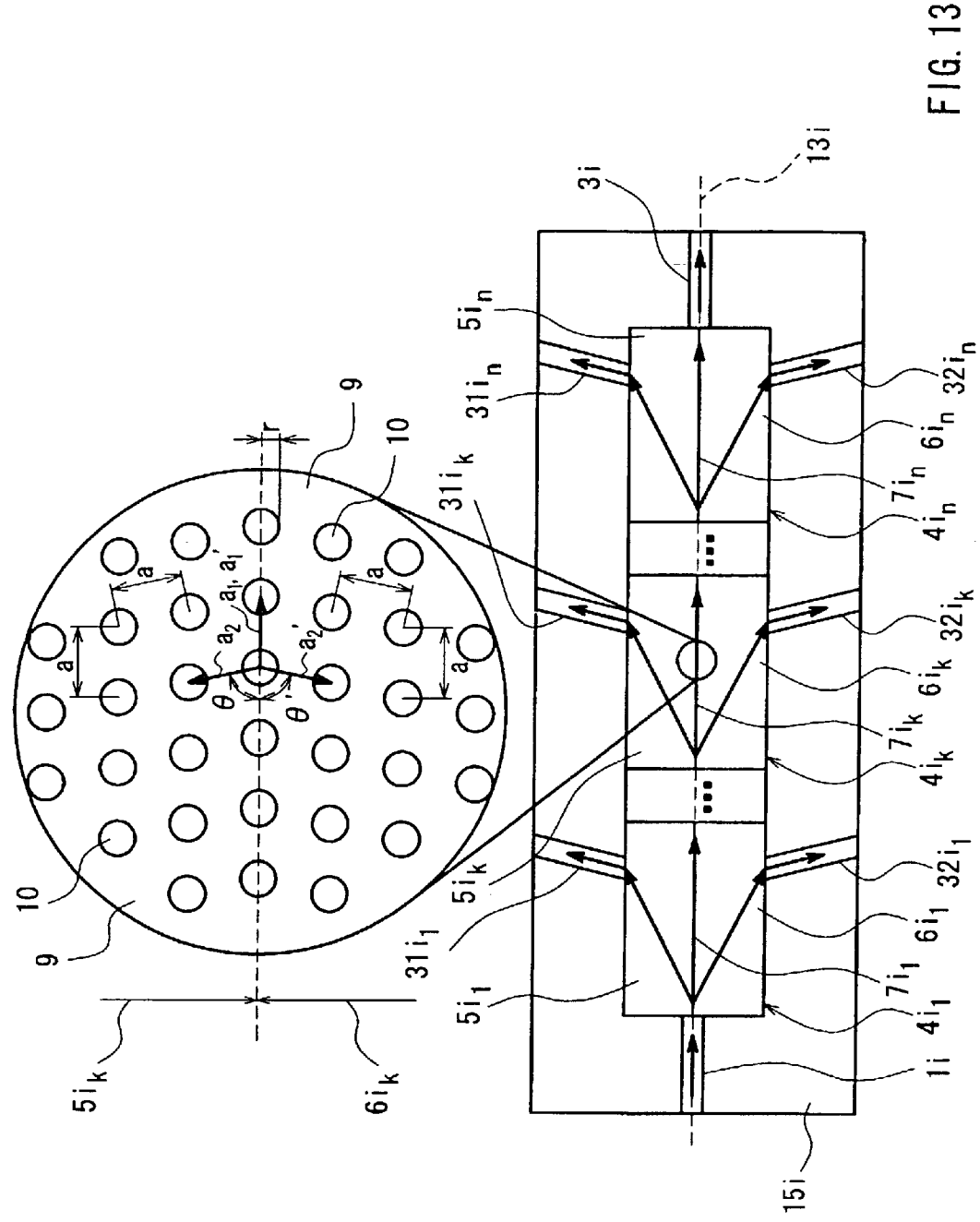
FIG. 13 is a plan view showing a configuration of an optical device of Embodiment 11 according to the present invention.

An optical device of Embodiment 11 of the present invention will be described with reference to FIG. 13. The optical device of Embodiment 11 is an optical filter with a separation function for WDM, in which complex photonic crystals, each including photonic crystals bonded to each other, are bonded in a multi-stage in a column.

Complex photonic crystals $4i_1$ to $4i_n$ are formed on a substrate $15i$ and have a configuration in which photonic crystals $6i_1$ to $6i_n$ and photonic crystals $5i_1$ to $5i_n$ are bonded at boundary faces $7i_1$ to $7i_n$. The photonic crystals $5i_1$ to $5i_n$ have wavelength dispersion characteristics different from those of the photonic crystals $6i_1$ to $6i_n$. The photonic crystal $5i_k$ and the photonic crystal $6i_k$ are bonded to each other at the boundary face $7i_k$ to form the complex photonic crystal $4i_k$. The photonic crystals $5i_k$ and $6i_k$ have a lattice structure in which the wavelength of selection light is the same, whereas the deflection direction thereof is symmetrical with respect to the boundary face $7i_k$. Thus, the complex photonic crystal $4i_k$ has a lattice structure in which columnar materials 10 are formed on the boundary face $7i_k$, and the other columnar materials 10 are disposed so as to be symmetrical with respect to the boundary face $7i_k$. A smaller angle between a primitive lattice vector a1 and a primitive lattice vector $a_2$ of the photonic crystal $5i_k$ is equal to a smaller angle between a primitive lattice vector $a_1'$ and a primitive lattice vector $a_2'$ of the photonic crystal $6i_k$, and the value thereof is smaller than 90° and larger than 60°.

Furthermore, the complex photonic crystals $4i_1$ to $4i_n$ are bonded to each other in a multi-stage so that the boundary faces $7i_1$ to $7i_n$ are on the same face, and outgoing optical fibers $31i_1$ to $31i_n$ and $32i_1$ to $32i_n$ are placed on both sides thereof.

An ingoing optical fiber $1i$ is placed on an end face of the complex photonic crystal $4i_1$ so that the optical axis $13i$ is placed on the boundary faces $7i_1$ to $7i_n$. The optical axis $13i$ also is an optical axis of an outgoing optical fiber $3i$ placed on an end face of the complex photonic crystal $4i_n$ in the final stage. When coupled light of light beams with a plurality of wavelengths is incident upon the complex photonic crystal $4i_1$ in the direction of a primitive lattice vector via the ingoing optical fiber $1i$, selection light is deflected to travel in the photonic crystals $5i_1$ and $6i_1$. One half of the coupled light incident upon the complex photonic crystal $4i_1$ propagates through the photonic crystal $5i_1$, and the other half propagates through the photonic crystal $6i_1$. Therefore, one half of selection light is branched to the photonic crystal $5i_1$ side, and the other half thereof is branched to the photonic crystal $6i_1$. That is, selection light is branched into two from the coupled light, whereby the selection light can be separated.

The deflected light is incident upon the outgoing optical fibers $31i_1$ and $32i_1$. The outgoing optical fibers $31i_1$ and $32i_1$ are set at positions where deflected light is incident.

Light other than the selection light of the complex photonic crystal $4i_1$ travels straight and is incident upon the complex photonic crystal $4i_2$ (not shown). Similarly, selection light is separated on the basis of the complex photonic crystals $4i_1$ to $4i_n$ and branched. Selection light of the respective photonic crystals $4i_1$ to $4i_n$ is different from each other. The outgoing optical fiber $3i$ is placed on the end face of the complex photonic crystal $4i_n$ in the final stage so that the optical axis $13i$ is included in the boundary face $7i_n$. The remaining light that has not been separated in the respective photonic crystals $4i_1$ to $4i_n$ is incident upon the outgoing optical fiber $3i$.

The refractive index of a first material 9 constituting the photonic crystal is set to be about 1.5 to 1.7. The photonic crystal is produced, for example, by arranging columnar materials 10, which are cylindrical air holes with a radius "r" of 0.08 to 0.3 times the wavelength of selection light, in a slab of $SiO_2$ or a polymer periodically at a lattice constant "a" (0.4 to 0.6 times the wavelength of selection light) in the direction of two primitive lattice vectors having an inner angle θ of 65° to 85°.

Furthermore, the outgoing optical fibers $31i_n$ and $32i_n$ may be placed on the end face of the complex photonic crystal $4i_n$ in the final stage, instead of the sides thereof. This enables the complex photonic crystal $4i_n$ in the final stage to be made shorter.

As described above, by bonding complex photonic crystals, each including photonic crystals capable of selectively deflecting a specific wavelength bonded to each other in a mirror symmetry, in a multi-stage in a column, selection light can be deflected in a symmetrical direction with respect to the primitive lattice vector. Because of this, two arbitrary wavelengths can be separated each time in an arbitrary order in WDM dealing with a plurality of wavelengths.

Embodiment 12

Figure 14:
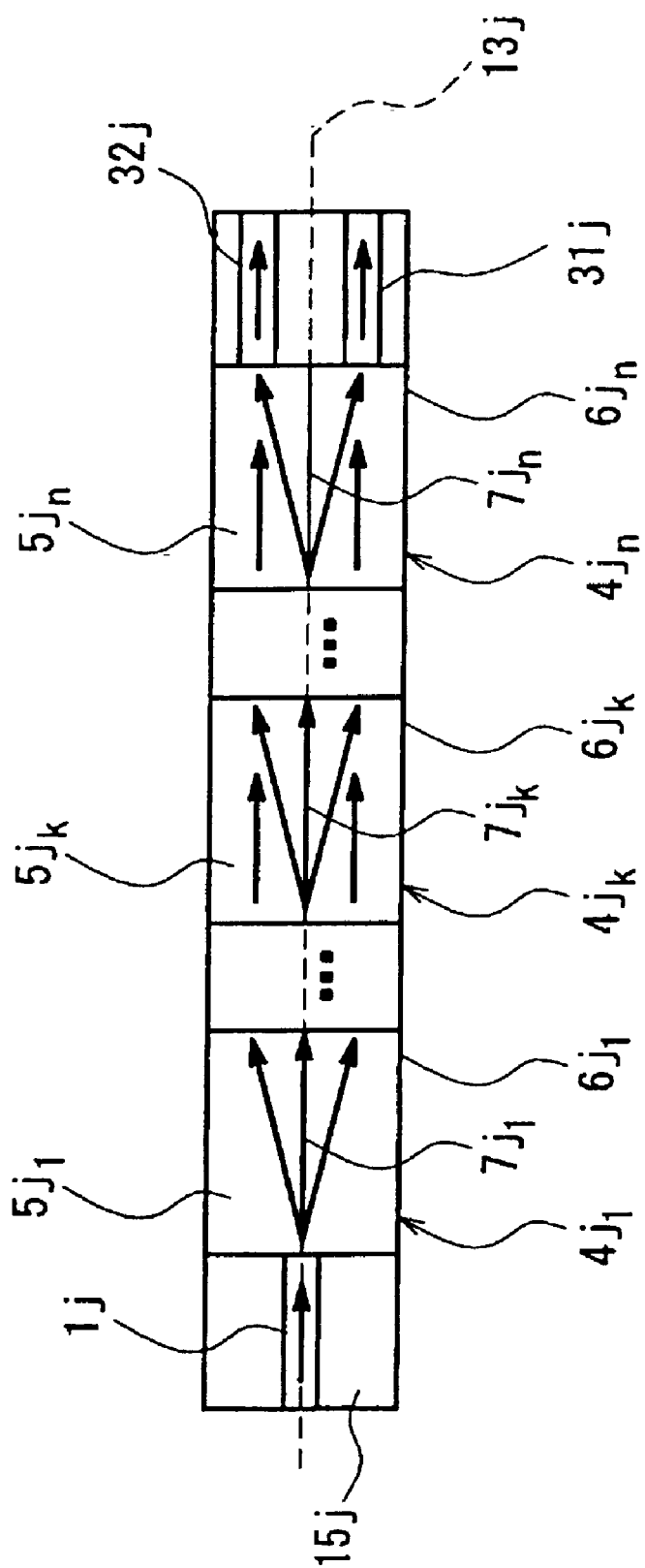
FIG. 14 is a plan view showing a configuration of an optical device of Embodiment 12 according to the present invention.

An optical device of Embodiment 12 according to the present invention will be described with reference to FIG. 14. The optical device of Embodiment 12 is a power separator for WDM. The optical device of Embodiment 12 has a configuration in which complex photonic crystals, each including photonic crystals bonded to each other, are bonded in a multi-stage in a column in the same way as in Embodiment 11.

The basic configuration of the optical device of Embodiment 12 is the same as that of the optical device of Embodiment 11. More specifically, complex photonic crystals $4j_1$ to $4j_n$ are formed on a substrate $15g$ and are bonded to each other in a column. The complex photonic crystals $4j_1$ to $4j_n$ have a configuration in which photonic crystals $6j_1$ to $6j_n$ are bonded to photonic crystals $5j_1$ to $5j_n$ at boundary faces $7j_1$ to $7j_n$. The lattice structures of the photonic crystals $6j_1$ to $6j_n$ and the photonic crystals $5j_1$ to $5j_n$ are the same as those of the photonic crystals $6i_1$ to $6i_n$ and the photonic crystals $5i_1$ to $5i_n$ of Embodiment 11. However, the length of the light propagation direction (direction of an optical axis $13j$) is shorter in the photonic crystals of Embodiment 12. The length of the light propagation direction is set in such a manner that when selection light is incident from one end face along a boundary face, the selection light is not deflected to be output from a side but is output from the other end face. Therefore, compared with the complex photonic crystals $4i_1$ to $4i_n$ of Embodiment 11, the complex photonic crystals $4j_1$ to $4j_n$ of Embodiment 12 can be made short. Because of this, an optical device can be miniaturized.

The complex photonic crystals $4j_1$ to $4j_n$ are bonded to each other so that the boundary faces $7i_1$ to $7j_n$ are on the same face. An ingoing optical fiber $1j$ is placed on an end face of the complex photonic crystal $4j_1$ in the first stage so that the boundary face $7j_1$ is overlapped with the optical axis $13j$. Outgoing optical fibers $31j$ and $32j$ are placed on an end face of the complex photonic crystal $4j_n$ in the final stage. The direction of the optical axis $13j$ also is the direction of a primitive lattice vector.

When coupled light of light beams with a plurality of wavelengths is incident upon the complex photonic crystal $4j_1$ in the direction of a primitive lattice vector via the ingoing optical fiber $1j$, selection light is deflected to travel in the photonic crystals $5j_1$ and $6j_1$. One half of the coupled light incident upon the complex photonic crystal $4j_1$ propagates through the photonic crystal $5j_1$, and the other half propagates through the photonic crystal $6j_1$. Therefore, one half of the selection light is deflected to the photonic crystal $5i_1$, and the other half of the selection light is deflected to the photonic crystal $6j_1$. Non-selection light travels straight along the optical axis $13j$, so that light is branched into three to be output from an end face of the complex photonic crystal $4j_1$, and is incident upon the complex photonic crystal $4j_1$, (not shown).

The light incident along the optical axis $13j$ and the selection light in the complex photonic crystal $4j_{k-1}$ that travels on both sides of the light incident along the optical axis $4j_k$ are incident upon the complex photonic crystal $4j_k$. The selection light in the respective complex photonic crystals $4j_1$ to $4j_n$ are different from each other. Therefore, the selection light in the complex photonic crystal $4j_{k-1}$ travels straight in the complex photonic crystal $4j_k$. Furthermore, light incident on the complex photonic crystal $4j_k$ along the optical axis $13j$ is coupled light. Among this coupled light, the selection light of the complex photonic crystal $4j_k$ is deflected to the photonic crystals $5j_k$ and $6j_k$, and is branched from the coupled light to be separated therefrom. Then, the separated light is coupled to the coupled light traveling straight from the complex photonic crystal $4j_{k-1}$, and is output from the complex photonic crystal $4j_k$. The coupled light with the selection light removed therefrom travels straight along the optical axis $13j$ and is output from the photonic crystal $4j_k$.

Thus, the selection light in the photonic crystal $4j_k$ is coupled to light on both sides. On the other hand, selection light is removed from the coupled light traveling straight along the optical axis $13j$.

In the photonic crystal $4j_n$ in the final stage, coupled light input from the ingoing optical fiber $15j$ is branched into two and output to the first outgoing optical fiber $31j$ and the second outgoing optical fiber $32j$.

As described above, power separation in WDM dealing with a plurality of wavelengths, which has been conducted by branching coupled light into light beams on the wavelength basis and coupling them, can be realized with an optical device having a simple configuration in which complex photonic crystals, each including photonic crystals capable of selectively deflecting a specific wavelength bonded to each other in a mirror symmetry, are bonded in column.

Embodiment 13

Figure 15:
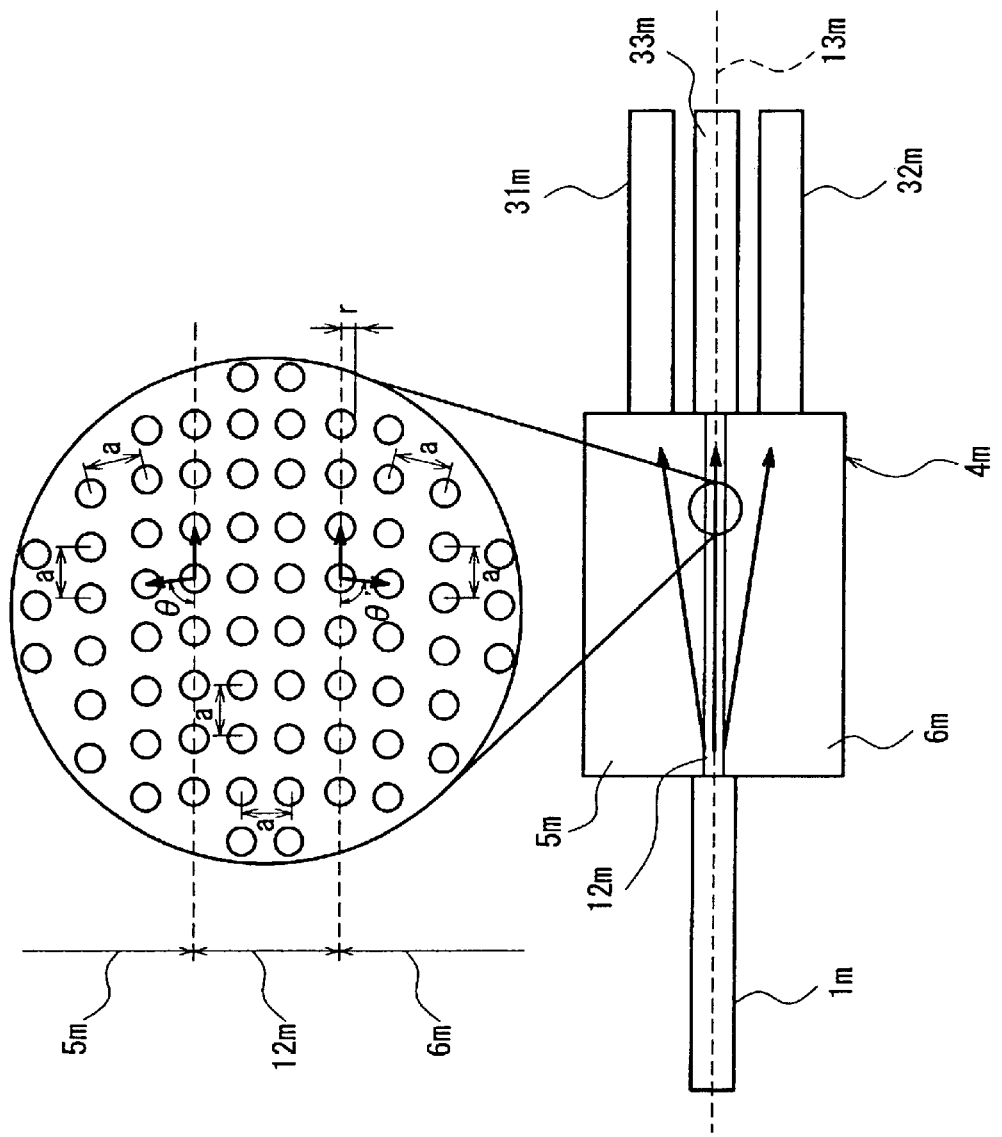
FIG. 15 is a plan view showing a configuration of an optical device of Embodiment 13 according to the present invention.

An optical device of Embodiment 13 according to the present invention will be described with reference to FIG. 15. The optical device of Embodiment 13 is an optical 3-separator.

The optical device of Embodiment 13 is composed of an ingoing optical fiber $1m$, outgoing optical fibers $31m$, $32m$, and $33m$, and a complex photonic crystal $4m$. In the complex photonic crystal $4m$, a photonic crystal $5m$ and a photonic crystal $6m$ are bonded to each other with a photonic crystal $12m$ interposed therebetween, instead of being directly bonded to each other. That is, the photonic crystals $5m$ and $6m$ are bonded to the photonic crystal $12m$.

The lattice structures of the photonic crystals $5m$ and $6m$ are the same as those of the photonic crystals $5$ and $6$ of Embodiment 1. More specifically, the lattice structures of the photonic crystals $5m$ and $6m$ have a low symmetry, so that when light having a predetermined wavelength propagates through the photonic crystals $5m$ and $6m$ in the direction of primitive vectors, the light is deflected. The directions of primitive vectors of the photonic crystals $5m$ and $6m$ are identical, and are the same as that of the optical axis $13m$ of the ingoing optical fiber $1m$. The lattice structures of the photonic crystals $5m$ and $6m$ are symmetrical with respect to the optical axis $13m$.

In the photonic crystal $12m$, cylindrical columnar materials $10$ are arranged in a first material $9$ so that central axes thereof are parallel to each other in the same way as in the photonic crystals $5m$ and $6m$, and the lattice constant "a" of the photonic crystal $12m$ also is the same as those of the photonic crystals $5m$ and $6m$. However, the photonic crystal $12m$ has a high symmetry, so that an inner angle between primitive lattice vectors is 90°. Even if predetermined light is allowed to be incident upon the photonic crystal $12m$ with such a configuration in the direction of a primitive lattice vector, the light travels straight through the photonic crystal $12m$ without being deflected.

The ingoing optical fiber $1m$ is placed on one end face of the complex photonic crystal $4m$, and an optical axis $43m$ thereof is present in the photonic crystal $12m$, preferably at a central position thereof. Outgoing optical fibers $31m$, $32m$ and $33m$ are placed on the other end face of the complex photonic crystal $4m$, and an optical axis of the outgoing optical fiber $33m$ is the same as the optical axis $13m$ of the ingoing optical fiber.

When selection light propagating through the ingoing optical fiber $1m$ is incident upon the complex photonic crystal $5m$ in the direction of a primitive lattice vector, the selection light is incident upon the respective photonic crystals $5m$, $6m$, and $12m$. Among the selection light, the light incident upon the photonic crystal $5m$ is deflected in a direction away from the optical axis $13m$, and the light incident upon the photonic crystal $6m$ also is defected in a direction away from the optical axis $13m$. The light incident upon the photonic crystal $12m$ travels straight. The outgoing optical fiber $31m$ is placed on an outgoing end face of the photonic crystal $5m$, and the outgoing optical fiber $32m$ is placed on an outgoing end face of the photonic crystal $6m$. The outgoing optical fiber $33m$ is placed on an outgoing end face of the photonic crystal $12m$. The respective outgoing optical fibers $31m$, $32m$, and $33m$ are arranged so as to receive light output from the complex photonic crystal $4m$.

As described above, coupling of three light beams, which has been very difficult with a conventional coupler, can be realized with a simple configuration.

The refractive index of a first material 9 constituting the photonic crystal is set to be about 1.5 to 1.7. The photonic crystal is produced, for example, by arranging columnar materials 10, which are cylindrical air holes with a radius "r" of 0.08 to 0.3 times the wavelength of selection light, in a slab of $SiO_2$ or a polymer periodically at a lattice constant "a" (0.4 to 0.6 times the wavelength of selection light) in the direction of two primitive lattice vectors having inner angles $\theta$ and $\theta'$ of 65° to 85°.

Embodiment 14

Figure 16:
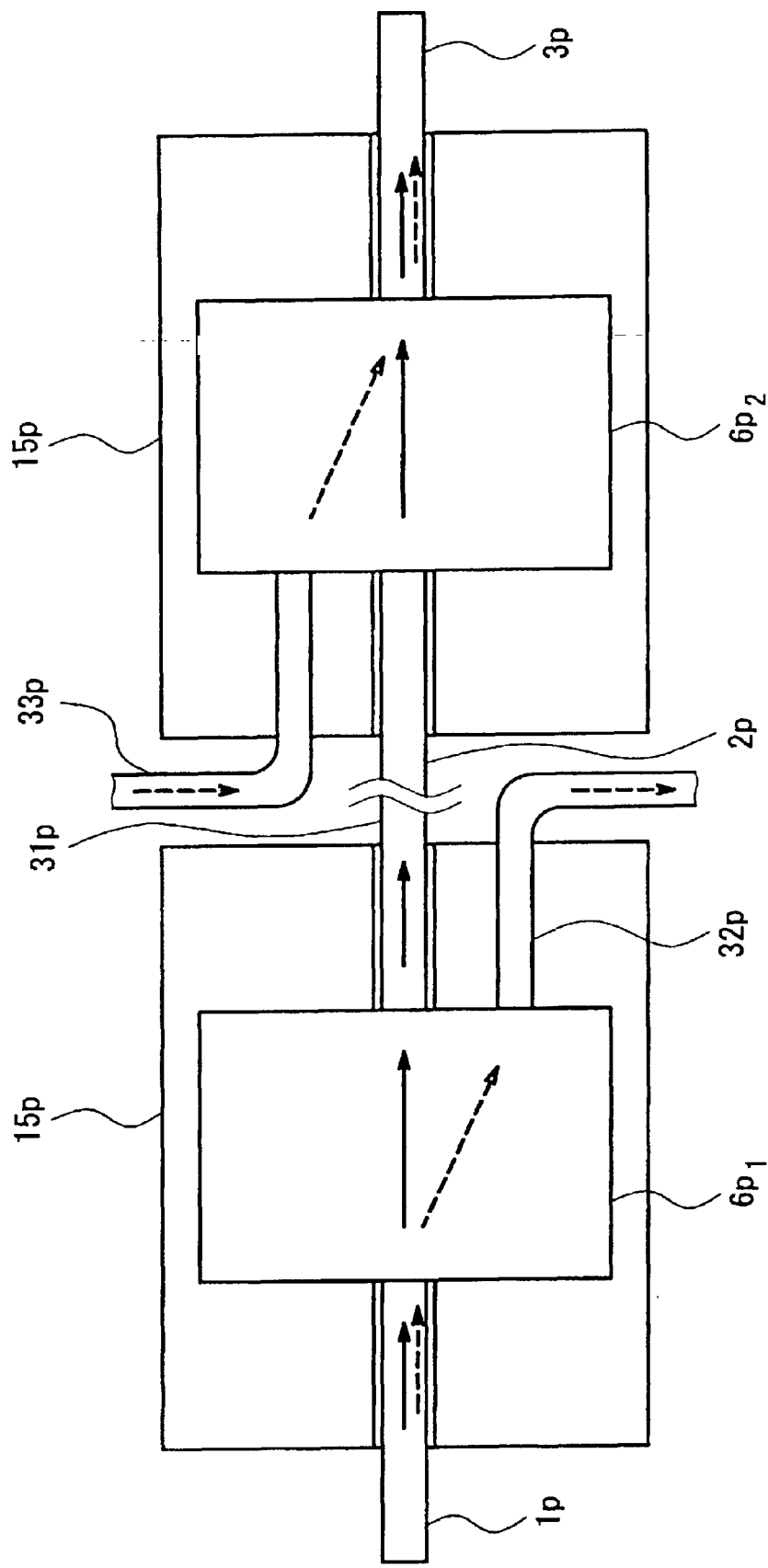
FIG. 16 is a plan view showing a configuration of an optical device of Embodiment 14 according to the present invention.

An optical device of Embodiment 14 according to the present invention will be described with reference to FIG. 16. The optical device of Embodiment 14 is an Add-Drop apparatus.

The optical device of Embodiment 14 has a configuration in which a photonic crystal $6p_1$ and a photonic crystal $6p_2$ formed on a substrate 15 p are connected to each other via an optical fiber. An ingoing optical fiber 1$p$ is connected to one end face of the photonic crystal $6p_1$. An outgoing optical fiber 31$p$ is connected to the other end face of the photonic crystal $6p_1$. An optical fiber 32$p$ for DROP is placed on the end face where the outgoing optical fiber 31$p$ is placed.

The ingoing optical fiber 2$p$ connected to the outgoing optical fiber 31$p$ is placed on one end face of the photonic crystal $6p_2$. An outgoing optical fiber 3$p$ is placed on the other end face thereof. Furthermore, an optical fiber 33$p$ for ADD is placed on the end face of the ingoing optical fiber 2$p$ side.

When selection light and non-selection light are input from the ingoing optical fiber 1$p$ to the photonic crystal $6p_1$ in the direction of a primitive lattice vector, the selection light is deflected, and the non-selection light travels straight. The non-selection light is output from the end face of the photonic crystal $6p_1$ and propagates through the outgoing optical fiber 31$p$. On the other hand, the selection light is deflected to be output from the end face of the photonic crystal $6p_1$ and is incident upon the optical fiber 32$p$ for DROP.

The optical fiber 32$p$ for DROP is previously placed at a position where the deflected selection light is output from the end face of the photonic crystal $6p_1$. The distance between the outgoing optical fiber 31$p$ and the optical fiber 32$p$ for DROP is proportional to the length of the photonic crystal $6p_1$.

The light propagating through the outgoing optical fiber 31$p$ is coupled to the ingoing optical fiber 2$p$ and is input to the photonic crystal $6p_2$. Furthermore, the selection light propagates through the optical fiber 33$p$ for ADD and is incident upon the photonic crystal $6p_2$ in the direction of a primitive vector.

The non-selection light travels straight, and the selection light is deflected so as to approach the non-selection light. The length of the photonic crystal $6p_2$ is previously adjusted so that the selection light and the non-selection light are coupled to each other at the end face thereof. The outgoing optical fiber 3$p$ is placed at a position where the coupled light is output. The coupled light of the selection light and the non-selection light output from the end face is incident upon the outgoing optical fiber 3$p$.

The optical device with such a configuration can externally modulate the light taken from the optical fiber 32$p$ for DROP and thereafter allow the light to be incident upon the optical fiber 33$p$ for ADD.

Thus, an optical device with a simple configuration can be realized, which is capable of taking only a particular wavelength and adding the wavelength again in the course of multiplex transmission of wavelengths such as WDM.

In Embodiments 1 to 14, the difference in a relative refractive index between the slab waveguide and the circular holes constituting the two-dimensional photonic crystal may be 1.0 or more. A high refractive material such as Si, GaAs, and $Ti_2O_5$ may be used for the slab waveguide, and a low refractive material such as $SiO_2$ may be used for the circular holes.

The photonic crystal may be interposed between claddings. Instead of using claddings, it also may be possible to place a photonic crystal in a gas, and to use the gas as claddings. For example, when a photonic crystal is placed in the air, a cladding with a refractive index of 1 is formed. It is not required to place the same claddings on both sides. Different materials may be combined appropriately.

Figure 17:
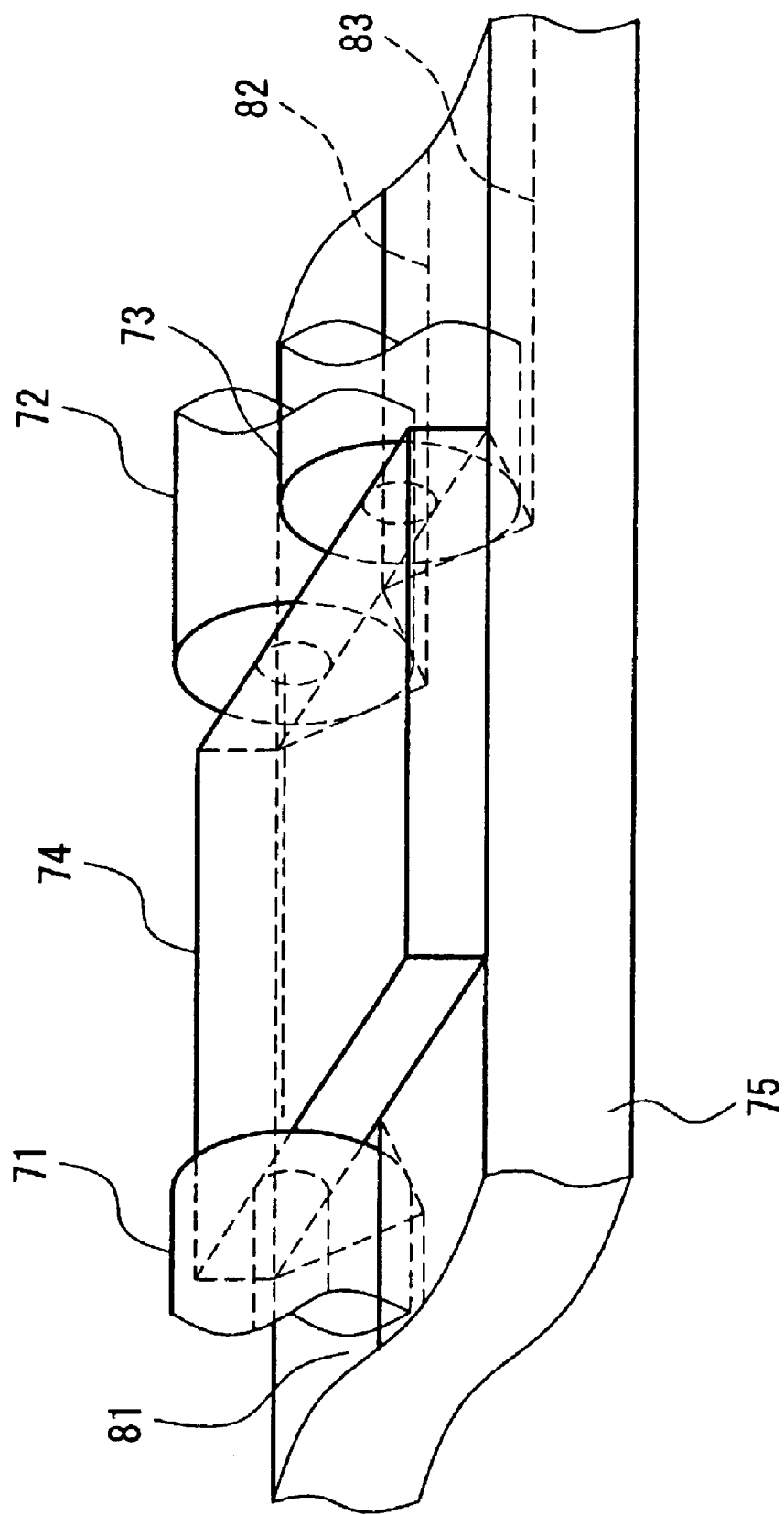
FIG. 17 is a perspective view showing a method for fixing an optical fiber according to the present invention.
Figure 18A:
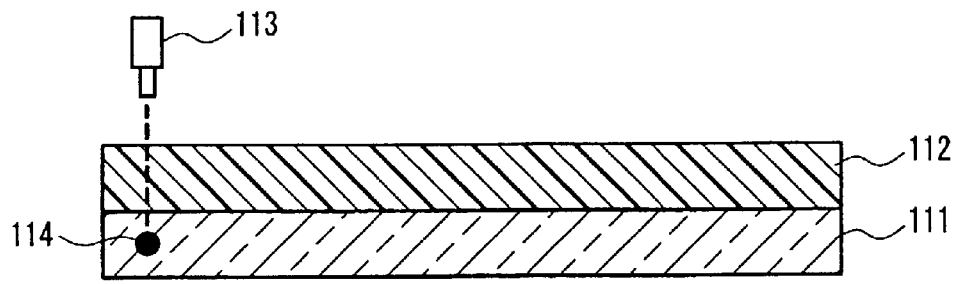
FIGS. 18A to 18D show processes of a method for producing a photonic crystal of Embodiment 15 according to the present invention.
Figure 18B:
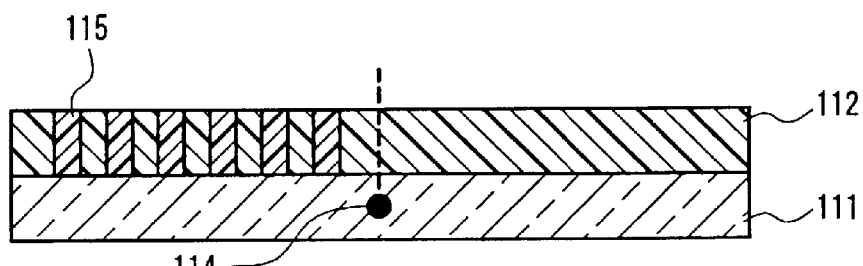
Figure 18C:
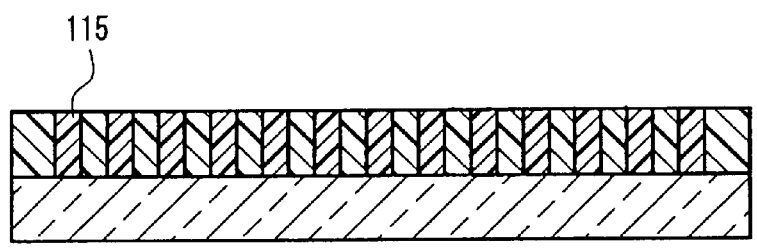
Figure 18D:
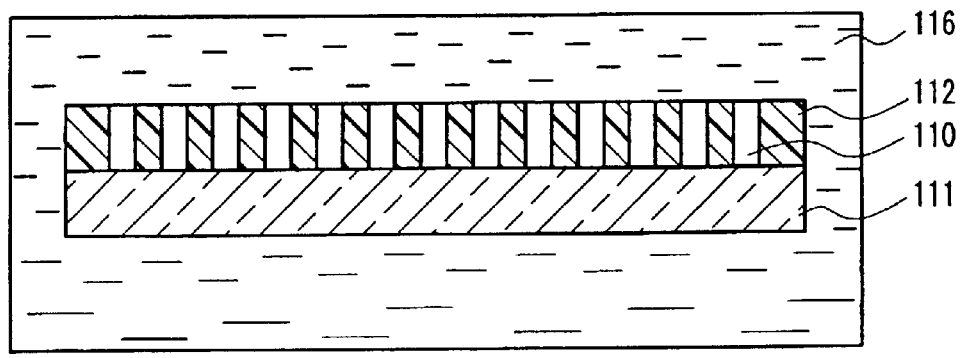
Figure 19:
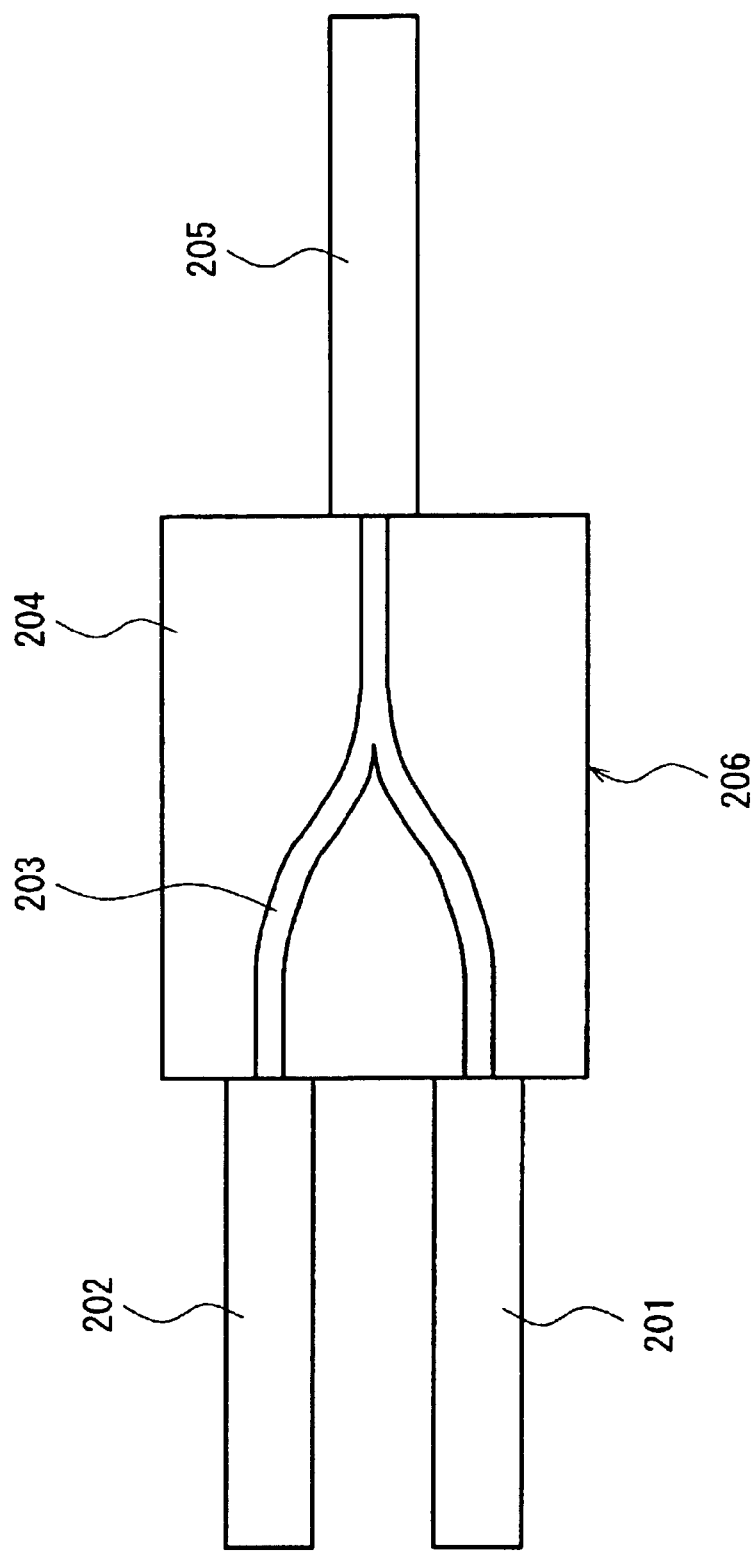
FIG. 19 is a plan view showing a configuration of a conventional optical coupler.

In the case of using an optical fiber for transmitting/receiving light with respect to each photonic crystal, as shown in FIG. 17, a substrate 75 that functions as a cladding of a photonic crystal 74 is designed to be large so as to provide V-grooves 81, 82, and 83 for positioning and fixing an optical fiber, thereby positioning optical fibers 71, 72, and 73. Alternatively, another substrate made of Si or the like is provided under a cladding, and V-grooves for positioning and fixing may be provided on the substrate. In the case of using an optical waveguide, a core may be formed on a substrate that functions as a cladding.

Furthermore, in the case of using a photonic crystal composed of columnar materials and circular holes, the refractive index of the air is varied depending upon the external environment. Therefore, the photonic crystal is sealed in an air-tight case, and the case is filled with a gas (Ar, N, etc.) or evacuated, whereby the columnar materials are stabilized.

Embodiment 15

A method for producing a photonic crystal of Embodiment 15 according to the present invention will be described with reference to FIGS. 18A to 18D. According to the production method of Embodiment 15, tracks produced by using a high-energy ion are eroded to provide circular holes 110 that are columnar materials. First, a thin film is vapor-deposited on a glass substrate 111 by sputtering, the glass substrate 111 is coated with a polymer by spin-coating, or casting is conducted with respect to the substrate 111 using a resin dissolved in a solvent to obtain a polymer slab 112 that is a first material. A single ion 114 such as H, O, Ar, Kr, Xe, Pb, or Zn is radiated to positions of the polymer slab 112 where the circular holes 110 are desired to be formed, using an ion injector 113, whereby the single ion 114 is allowed to penetrate through the polymer slab 112. The energy of the ion is set to be 1 MeV or more, and the kind of the ion is determined depending upon the density and thickness of the polymer slab 112. By setting the energy to be 1 MeV or more, the ion penetrates the polymer slab 112 deeply.

Tracks 115 (traces where molecular binding is cut) are formed in the positions of the polymer slab 112 where the single ion has penetrated. By soaking the polymer slab 112 in a strong alkaline solution 116 such as NaOH, the tracks 115 are eroded to form the circular holes 110, whereby a desired photonic crystal can be produced in the polymer slab 112.

The single ion 114 injected from the ion injector 113 can be controlled for an injection position with an external electric field. Therefore, any crystal structure can be produced by controlling an external electric field. Furthermore, the number of ions to be injected to the same position can be set arbitrarily, so that treatment with reproducibility can be conducted.

It also is possible to control the ion injection position by moving either of the ion injector 113 and the polymer slab 112 that is a target. Although the circular holes 112 are arranged periodically in the photonic crystal 118, the circular holes 112 may be filled with a material having a refractive index different from that of the polymer slab 112.

Furthermore, a substrate may not be placed on a photonic crystal. The following also may be possible: after the polymer slab 112 is formed on the glass substrate 111, the glass substrate 111 is removed; and a high-energy ion is radiated to the polymer slab 112 as described above, followed by etching, whereby a photonic crystal is produced.

According to the present invention, an optical device that requires high precision for production can be produced easily and miniaturized.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical device comprising:
    a complex photonic crystal in which a plurality of materials with different refractive indices are placed periodically, whereby a plurality of photonic crystals with a periodic refractive index distribution are arranged in a column in a direction of a common primitive lattice vector;
    an ingoing optical waveguide for allowing light to be incident upon the complex photonic crystal; and
    an outgoing optical waveguide for receiving light output from the complex photonic crystal.

2. An optical device according to claim 1, wherein, in each of the photonic crystals, at least one of a refractive index of the plurality of materials and a periodic structure of a refractive index thereof is varied on the photonic crystal basis.

3. An optical device according to claim 1, wherein each of the photonic crystals is a two-dimensional photonic crystal.

4. An optical device according to claim 1, wherein two primitive lattice vectors of each of the photonic crystals are parallel to each other, and either one of the two primitive lattice vectors is matched with an optical axis.

5. An optical device according to claim 1, wherein the ingoing optical waveguide and the outgoing optical waveguide are optical fibers.

6. An optical device according to claim 1, wherein the photonic crystal is interposed between a first cladding and a second cladding.

7. An optical device according to claim 6, wherein a refractive index of at least one of the first cladding and the second cladding is 1.

8. An optical device according to claim 1, comprising a groove for positioning the ingoing optical waveguide and the outgoing optical waveguide that are optical fibers.

9. An optical device according to claim 8, wherein the groove is integrated with each of the photonic crystals directly or indirectly.

10. An optical device according to claim 1, wherein the complex photonic crystal is covered with an air-tight case completely, and an inside of the air-tight case is filled with a gas or evacuated.

11. An optical device according to claim 1, wherein each of the photonic crystals has a refractive index period determined by a specific wavelength of light that is defected in each of the photonic crystals, and the specific wavelength is varied depending upon each of the photonic crystals.

12. An optical device according to claim 11, wherein an order in a column of each of the photonic crystals is determined based on the specific wavelength of each of the photonic crystals.

13. An optical device according to claim 11, wherein each of the photonic crystals has a two-dimensional lattice structure in which a first material and columnar materials having different refractive indices are provided, and the columnar materials are arranged periodically in the first material so that axes of the columnar materials are parallel to each other,
    an acute angle between two primitive lattice vectors of the photonic crystal is larger than 60° and smaller than 90°,
    the photonic crystals are arranged in a column in a direction of a first primitive lattice vector that is one of the two primitive lattice vectors to form the complex photonic crystal,
    the ingoing optical waveguide includes a first ingoing optical waveguide that is placed on a photonic crystal in a first stage of the complex photonic crystal, for allowing light other than light having a specific wavelength of each of the photonic crystals to be incident upon the complex photonic crystal in the direction of the first primitive lattice vector, and a second ingoing optical waveguide that is placed on each of the photonic crystals, for allowing light having a specific wavelength to be incident upon each of the photonic crystals, and
    the outgoing optical waveguide is placed so as to have the same optical axis as that of the first ingoing optical waveguide.

14. An optical device according to claim 13, wherein a difference between a refractive index of the first material and a refractive index of the columnar materials is at least 1.0.

15. An optical device according to claim 13, wherein the first material is made of a polymer, and the columnar materials are made of a gas.

16. An optical device according to claim 13, wherein a cross-sectional shape of the columnar materials is a circle with a radius of 0.08 to 0.3 times the specific wavelength.

17. An optical device according to claim 13, wherein a lattice constant of each of the photonic crystals is 0.4 to 0.6 times the specific wavelength of each of the photonic crystals.

18. An optical device according to claim 13, wherein the second ingoing optical waveguide is placed on a side of each of the photonic crystals.

19. An optical device according to claim 13, wherein end faces of the photonic crystals increase in size successively, and the second ingoing optical waveguide is placed on the end face of each of the photonic crystals.

20. An optical device according to claim 13, wherein each of the photonic crystals at least other than the photonic crystal in a final stage has a mirror, which has a predetermined angle with respect to an outgoing end face connected in a column, on a part of the end face, and light from the second ingoing optical waveguide is reflected from the mirror and is incident upon the photonic crystal in a subsequent stage.

21. An optical device according to claim 11, wherein each of the photonic crystals has a two-dimensional lattice structure in which a first material and columnar materials having different refractive indices are provided, and the columnar materials are arranged periodically in the first material so that axes of the columnar materials are parallel to each other,
    an acute angle between two primitive lattice vectors of the photonic crystal is larger than 60° and smaller than 90°, the photonic crystals are arranged in a column in a direction of a first primitive lattice vector that is one of the two primitive lattice vectors to form the complex photonic crystal, the ingoing optical waveguide allows light to be incident upon the complex photonic crystal in the direction of the first primitive lattice vector, and the outgoing optical waveguide includes a first outgoing optical waveguide that is placed on a photonic crystal in a final stage of the complex photonic crystal, for receiving light output in the direction of the first primitive lattice direction, and a second outgoing optical waveguide placed on each of the photonic crystals.

22. An optical device according to claim 21, wherein a difference between a refractive index of the first material and a refractive index of the columnar materials is at least 1.0.

23. An optical device according to claim 21, wherein the first material is made of a polymer, and the columnar materials are made of a gas.

24. An optical device according to claim 21, wherein a cross-sectional shape of the columnar materials is a circle with a radius of 0.08 to 0.3 times the specific wavelength.

25. An optical device according to claim 21, wherein the second outgoing optical waveguide placed on each of the photonic crystals receives light with the specific wavelength, which is deflected in the photonic crystal and output therefrom.

26. An optical device according to claim 21, wherein a lattice constant of each of the photonic crystals is 0.4 to 0.6 times the specific wavelength of each of the photonic crystals.

27. An optical device according to claim 21, wherein the second outgoing optical waveguide is placed on a side of each of the photonic crystals.

28. An optical device according to claim 27, wherein only the second outgoing optical waveguide connected to the photonic crystal in the final stage of the complex photonic crystal is placed on an end face of the photonic crystal.

29. An optical device according to claim 21, wherein end faces of the photonic crystals decrease in size successively, and the second outgoing optical waveguide is placed on the end face of each of the photonic crystals.

30. An optical device according to claim 21, wherein each of the photonic crystals at least other than the photonic crystal in a first stage has a mirror, which has a predetermined angle with respect to an ingoing end face connected in a column, on a part of the end face, and the second outgoing optical waveguide is provided at a position so as to receive light reflected from the mirror, which has the specific wavelength and is output from the photonic crystal in a previous stage.

31. An optical device comprising:

a second complex photonic crystal in which a plurality of first complex photonic crystals, each including a first photonic crystal and a second photonic crystal connected to each other, are connected in a column so that each boundary face is placed on the same face;

an ingoing optical waveguide for allowing light to be incident upon the second complex photonic crystal; and an outgoing optical waveguide for receiving light output from the second complex photonic crystal.

32. An optical device according to claim 31, wherein the ingoing optical waveguide and the outgoing optical waveguide are optical fibers.

33. An optical device according to claim 31, wherein the second complex photonic crystal is interposed between a first cladding and a second cladding.

34. An optical device according to claim 33, wherein a refractive index of at least one of the first cladding and the second cladding is 1.

35. An optical device according to claim 31, comprising a groove for positioning the ingoing optical waveguide and the outgoing optical waveguide that are optical fibers.

36. An optical device according to claim 35, wherein the groove is integrated with the second complex photonic crystal directly or indirectly.

37. An optical device according to claim 31, wherein the second complex photonic crystal is covered with an air-tight case completely, and an inside of the air-tight case is filled with a gas or evacuated.

38. An optical device according to claim 31, wherein the first photonic crystal and the second photonic crystal have a two-dimensional lattice structure in which a first material and columnar materials having different refractive indices are provided, and the columnar materials are arranged periodically in the first material so that axes of the columnar materials are parallel to each other, an acute angle between respective primitive lattice vectors of the first photonic crystal and the second photonic crystal is larger than 60° and smaller than 90°, a first primitive lattice vector of the first photonic crystal and a first primitive lattice vector of the second photonic crystal are parallel to each other, and are parallel to a boundary face where the first photonic crystal and the second photonic crystal are bonded to each other, a lattice structure of the first photonic crystal is symmetrical to a lattice structure of the second photonic crystal with respect to the boundary face, and the outgoing optical waveguide is placed on an end face of the first complex photonic crystal in a final stage of the second complex photonic crystal.

39. An optical device according to claim 38, wherein a length of each of the first complex photonic crystals is set so that light beams with wavelengths specific to each of the first photonic crystals and each of the second photonic crystals, which are deflected therein and output therefrom, are output from end faces of each of the first photonic crystals and each of the second photonic crystals.

40. An optical device according to claim 38, wherein a length of each of the first complex photonic crystal is set so that light beams with wavelengths specific to each of the first photonic crystal and each of the second photonic crystal, which are deflected therein, cross each other at an end of each of the photonic crystals.

41. An optical device according to claim 38, wherein a difference between a refractive index of the first material and a refractive index of the columnar materials is at least 1.0.

42. An optical device according to claim 38, wherein the first material is made of a polymer, and the columnar materials are made of a gas.

43. An optical device according to claim 38, wherein a lattice constant of the first photonic crystal and the second photonic crystal is 0.4 to 0.6 times the specific wavelength.

44. An optical device according to claim 38, wherein a cross-sectional shape of the columnar materials is a circle with a radius of 0.08 to 0.3 times the specific wavelength.

45. An optical device according to claim 31, wherein each of the first photonic crystal and the second photonic crystal has a two-dimensional lattice structure in which a first material and columnar materials having different refractive indices are provided, and the columnar materials are arranged periodically in the first material so that axes of the columnar materials are parallel to each other, an acute angle between respective primitive lattice vectors of the first photonic crystal and the second photonic crystal is larger than 60° and smaller than 90°, a first primitive lattice vector of the first photonic crystal and a first primitive lattice vector of the second photonic crystal are parallel to each other, and are parallel to a boundary face where the first photonic crystal and the second photonic crystal are bonded to each other, a lattice structure of the first photonic crystal is symmetrical to a lattice structure of the second photonic crystal with respect to the boundary face, and the outgoing optical waveguide includes a first outgoing optical waveguide placed on the first photonic crystal in a final stage of the second complex photonic crystal, for receiving light output in a direction of the first primitive lattice vector, and a second outgoing optical waveguide placed on each of the first complex photonic crystals, for receiving light beams with wavelengths specific to each of the first photonic crystals and each of the second photonic crystals, which are deflected therein and output therefrom.

46. An optical device according to claim 45, wherein a difference between a refractive index of the first material and a refractive index of the columnar materials is at least 1.0.

47. An optical device according to claim 45, wherein the first material is made of a polymer, and the columnar materials are made of a gas.

48. An optical device according to claim 45, wherein a lattice constant of each of the first photonic crystal and the second photonic crystal is 0.4 to 0.6 times the specific wavelength.

49. An optical device according to claim 45, wherein a cross-sectional shape of the columnar materials is a circle with a radius of 0.08 to 0.3 times the specific wavelength.

50. An optical device comprising:

a first photonic crystal having a first ingoing optical waveguide placed on an ingoing end face and a first outgoing optical waveguide and an optical waveguide for DROP placed on an outgoing end face; and a second photonic crystal having a second ingoing optical waveguide and an optical waveguide for ADD placed on an ingoing end face and a second outgoing optical waveguide placed on an outgoing end face, wherein the first outgoing optical waveguide and the second ingoing optical waveguide, or the first ingoing optical waveguide and the first outgoing optical waveguide are connected to each other, the first photonic crystal and the second photonic crystal have a two-dimensional lattice structure in which a first material and columnar materials having different refractive indices are provided, and the columnar materials are arranged periodically in the first material so that axes of the columnar materials are parallel to each other, an acute angle between respective primitive lattice vectors of the first photonic crystal and the second photonic crystal is larger than 60° and smaller than 90°, light incident upon the optical waveguide for DROP has a specific wavelength so as to be deflected in the first photonic crystal, light incident upon the second photonic crystal from the optical waveguide for ADD has a specific wavelength so as to be deflected in the second photonic crystal.

51. An optical device according to claim 50, wherein light that is deflected in the first photonic crystal and is incident upon the optical waveguide for DROP is processed to be incident upon the optical waveguide for ADD.

52. An optical device according to claim 50, wherein the first ingoing optical waveguide, the second ingoing optical waveguide, the first outgoing optical waveguide, the second outgoing optical waveguide, the optical waveguide for ADD, and the optical waveguide for DROP are optical fibers.

53. An optical device comprising:

a complex photonic crystal having a configuration in which a waveguide portion is interposed between a first photonic crystal and a second photonic crystal;

an ingoing optical waveguide placed on one end face of the complex photonic crystal; and three outgoing optical waveguides placed on the other end face of the complex photonic crystal, wherein the first photonic crystal and the second photonic crystal have a two-dimensional lattice structure in which a first material and columnar materials having different refractive indices are provided, and the columnar materials are arranged periodically in the first material so that axes of the columnar materials are parallel to each other, an acute angle between respective primitive lattice vectors of the first photonic crystal and the second photonic crystal is larger than 60° and smaller than 90°, a direction of a first primitive lattice vector of the first photonic crystal, a direction of a first primitive lattice vector of the second photonic crystal, a direction of an optical axis of the ingoing optical waveguide, a boundary face between the first photonic crystal and the waveguide portion, and a boundary face between the second photonic crystal and the waveguide portion are parallel to each other, a lattice structure of the first photonic crystal is symmetrical to a lattice structure of the second photonic crystal with respect to the waveguide portion, and an optical axis of the ingoing optical waveguide is in the waveguide portion and is identical with an optical axis of one of the outgoing optical waveguides, and optical axes of the other two outgoing optical waveguides are placed so as to be symmetrical to the optical axis of the ingoing optical waveguide.

54. An optical device according to claim 53, wherein the ingoing optical waveguide and the outgoing optical waveguide are optical fibers.

55. An optical device according to claim 53, wherein a width of the waveguide portion is smaller than a core diameter of the ingoing optical waveguide.

56. An optical device comprising:

a complex photonic crystal having a configuration in which a waveguide portion is interposed between a first photonic crystal and a second photonic crystal;

three ingoing optical waveguides placed on one end face of the complex photonic crystal; and an outgoing optical waveguide placed on the other end face of the complex photonic crystal, wherein the first photonic crystal and the second photonic crystal have a two-dimensional lattice structure in which a first material and columnar materials having different refractive indices are provided, and the columnar materials are arranged periodically in the first material so that axes of the columnar materials are parallel to each other, an acute angle between respective primitive lattice vectors of the first photonic crystal and the second photonic crystal is larger than 60° and smaller than 90°, a direction of a first primitive lattice vector of the first photonic crystal, a direction of a first primitive lattice vector of the second photonic crystal, a direction of an optical axis of the ingoing optical waveguide, a boundary face between the first photonic crystal and the waveguide portion, and a boundary face between the second photonic crystal and the waveguide portion are parallel to each other, a lattice structure of the first photonic crystal is symmetrical to a lattice structure of the second photonic crystal with respect to the waveguide portion, and an optical axis of one of the ingoing optical waveguides is in the waveguide portion and is identical with an optical axis of the outgoing optical waveguide, and optical axes of the other two ingoing optical waveguides are placed so as to be symmetrical to the optical axis of one of the ingoing optical wave guides.

57. An optical device according to claim 56, wherein the ingoing optical waveguide and the outgoing optical waveguide are optical fibers.

58. An optical device according to claim 56, wherein a width of the waveguide portion is smaller than a core diameter of the ingoing optical waveguide.

59. An optical device comprising:

a complex photonic crystal in which a first photonic crystal is bonded to a second photonic crystal;

a first ingoing optical waveguide for allowing light to be incident upon the first photonic crystal of the complex photonic crystal;

a second ingoing optical waveguide for allowing light to be incident upon the second photonic crystal of the complex photonic crystal; and an outgoing optical waveguide for receiving light output from the complex photonic crystal, wherein the first photonic crystal and the second photonic crystal have a two-dimensional lattice structure in which a first material and columnar materials having different refractive indices are provided, and the columnar materials are arranged periodically in the first material so that axes of the columnar materials are parallel to each other, an acute angle between respective primitive lattice vectors of the first photonic crystal and the second photonic crystal is larger than 60° and smaller than 90°, a first primitive lattice vector of the first photonic crystal and a first primitive lattice vector of the second photonic crystal are parallel to each other, and are parallel to a boundary face where the first photonic crystal and the second photonic crystal are bonded to each other, a lattice structure of the first photonic crystal is symmetrical to a lattice structure of the second photonic crystal with respect to the boundary face, and light beams specific to each of the first photonic crystals and each of the second photonic crystals, which are deflected therein and output therefrom, cross each other on an end face of the complex photonic crystal.

60. An optical device according to claim 59, wherein the first ingoing optical waveguide, the second ingoing optical waveguide, and the outgoing optical waveguide are optical fibers.

61. An optical device comprising:

a photonic crystal;

a first ingoing optical waveguide and a second ingoing optical waveguide for allowing light to be incident upon the photonic crystal; and an outgoing optical waveguide for receiving light output from the photonic crystal, wherein the photonic crystal has a two-dimensional lattice structure in which a first material and columnar materials having different refractive indices are provided, and the columnar materials are arranged periodically in the first material so that axes of the columnar materials are parallel to each other, an acute angle between primitive lattice vectors of the photonic crystal is larger than 60° and smaller than 90°, the first ingoing optical waveguide and the second ingoing optical waveguide allow light to be incident in a direction of a first primitive lattice vector of the photonic crystal, and an optical axis of the first ingoing optical waveguide is identical with an optical axis of the outgoing optical waveguide.

62. An optical device according to claim 61, wherein the first ingoing optical waveguide, the second ingoing optical waveguide, and the outgoing optical waveguide are optical fibers.

63. An optical device according to claim 61, wherein a distance between the first ingoing optical waveguide and the second ingoing optical waveguide is proportional to a length of the photonic crystal.

* * * * *

UNITED STATES PATENT AND TRADEMARK OFFICE
CERTIFICATE OF CORRECTION

PATENT NO. : 6,707,597 B2
DATED : March 16, 2004
INVENTOR(S) : Hamada

It is certified that error appears in the above-identified patent and that said Letters Patent is hereby corrected as shown below:

Column 35,
Line 16, "wave guides" should read -- waveguides --

Signed and Sealed this

Seventh Day of December, 2004

JON W. DUDAS
*Director of the United States Patent and Trademark Office*